US012683297B2

(12) United States Patent
Hashimoto

(10) Patent No.: US 12,683,297 B2
(45) Date of Patent: Jul. 14, 2026

(54) ELECTRONIC DEVICE

(71) Applicant: Innolux Corporation, Miaoli County (TW)

(72) Inventor: Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 59 days.

(21) Appl. No.: 18/961,419

(22) Filed: Nov. 26, 2024

(65) Prior Publication Data

US 2025/0392056 A1 Dec. 25, 2025

Related U.S. Application Data

(60) Provisional application No. 63/661,896, filed on Jun. 20, 2024.

(51) Int. Cl.

| | |
|---|---|
| ***H01Q 1/22*** | (2006.01) |
| ***G09G 3/32*** | (2016.01) |
| ***H01Q 3/26*** | (2006.01) |
| ***H01Q 3/28*** | (2006.01) |
| ***H01Q 23/00*** | (2006.01) |

(52) U.S. Cl.

CPC ............... *H01Q 23/00* (2013.01); *H01Q 1/22* (2013.01); *H01Q 3/28* (2013.01)

(58) Field of Classification Search

CPC ............ H01Q 1/22; H01Q 23/00; H01Q 3/26; H01Q 3/28; G09G 3/32; G09G 3/3233; G09G 3/36

See application file for complete search history.

(56) References Cited

U.S. PATENT DOCUMENTS

| | | | | |
|---|---|---|---|---|
| 8,749,459 | B2 * | 6/2014 | Shin | G09G 3/3225 345/82 |
| 9,721,502 | B2 * | 8/2017 | Bi | G09G 3/3233 |
| 10,056,032 | B2 * | 8/2018 | Kwon | G09G 3/3233 |
| 10,388,214 | B2 * | 8/2019 | Na | G09G 3/3233 |
| 11,308,876 | B2 * | 4/2022 | Liu | G09G 3/3275 |
| 11,935,483 | B2 * | 3/2024 | Yuan | G09G 3/3233 |
| 12,451,059 | B1 * | 10/2025 | Hashimoto | G09G 3/32 |

FOREIGN PATENT DOCUMENTS

| | | |
|---|---|---|
| CN | 101174043 | 4/2011 |
| CN | 109416300 | 3/2019 |

* cited by examiner

*Primary Examiner* — Tho G Phan

(74) *Attorney, Agent, or Firm* — JCIPRNET

(57) ABSTRACT

An electronic device is provided. The electronic device includes a plurality of electronic units. Each of the plurality of electronic units includes a pixel circuit and a plurality of tunable circuits. The plurality of tunable circuits is coupled to the pixel circuit. The pixel circuit includes at least one scan transistor a plurality of de-multiplexer transistors, a plurality of bias transistors, and a storage capacitor. The plurality of de-multiplexer transistors is coupled to the at least one scan transistor. The plurality of bias transistors is coupled to the plurality of de-multiplexer transistors. The storage capacitor is coupled to a data line through the at least one scan transistor.

20 Claims, 15 Drawing Sheets

ELECTRONIC DEVICE

CROSS-REFERENCE TO RELATED APPLICATION

This application claims the priority benefit of U.S. provisional application No. 63/661,896, filed on Jun. 20, 2024. The entirety of the above-mentioned patent application is hereby incorporated by reference herein and made a part of this specification.

BACKGROUND

Technical Field

The disclosure relates a device; particularly, the disclosure relates to an electronic device.

Description of Related Art

For a conventional electronic device having a plurality of tunable circuits, when the plurality of tunable circuits is formed on a non-rectangular substrate, it is easy to make wiring and/or transistor layout difficulties, and the tunable circuit layout space in some substrate areas to become crowded and a driving of the plurality of tunable circuits to become inefficient when the plurality of tunable circuits has different tunable characteristics.

SUMMARY

The electronic device of the disclosure includes a plurality of electronic units. Each of the plurality of electronic units includes a pixel circuit and a plurality of tunable circuits. The plurality of tunable circuits is coupled to the pixel circuit. The pixel circuit includes at least one scan transistor, a plurality of de-multiplexer transistors, a plurality of bias transistors, and a storage capacitor. The plurality of de-multiplexer transistors is coupled to the at least one scan transistor. The plurality of bias transistors is coupled to the plurality of de-multiplexer transistors. The storage capacitor is coupled to a data line through the at least one scan transistor.

Base on the above, according to the electronic device of the disclosure, a number of scan lines of the electronic device may be effectively reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
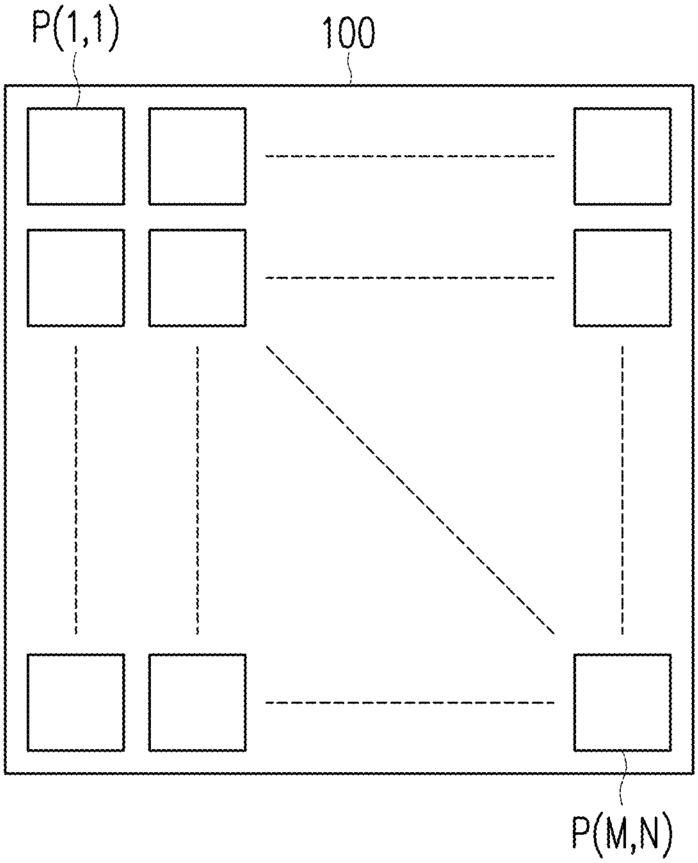
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an electronic device according to an embodiment of the disclosure. Referring to FIG. 1, the electronic device 100 includes a plurality of tunable circuits P(1,1) to P(M,N), where M and N are positive integers. In the embodiment of the disclosure, the tunable circuits P(1,1) to P(M,N) may be disposed on a panel substrate, and the panel substrate may be circular, rectangular or any shape etc. The tunable circuits P(1,1) to P(M,N) may be arranged in an array or non-array manner, and are not limited to those shown in the FIG. 1. In one embodiment of the disclosure, the electronic device 100 may be a beam-steerable bidirectional antenna device, and the tunable circuits P(1,1) to P(M,N) may form a plurality of transmitter circuits and a plurality of receiver circuits of the beam-steerable bidirectional antenna device.

In the embodiment of the disclosure, the electronic device 100 may further include a plurality of data lines and a plurality of scan lines for driving the tunable circuits P(1,1) to P(M,N). The electronic device 100 may further include a plurality of electronic units (not shown in FIG. 1), and each of the electronic units may include multiple tunable circuits, such as two tunable circuits or four tunable circuits. Moreover, the each of the electronic units may further include one pixel circuit for a selective scanning of multiple tunable circuits in a multiplexing manner.

Figure 2:
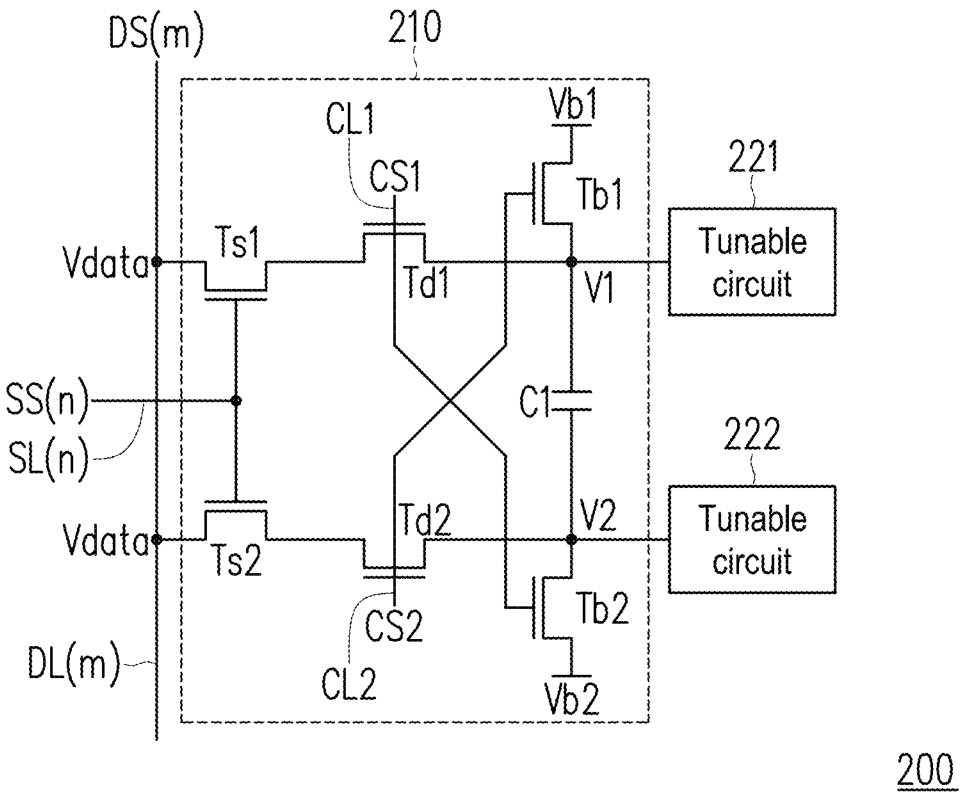
FIG. 2 is a schematic diagram of an electronic unit according to an embodiment of the disclosure.

FIG. 2 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 2, each of the electronic units of the above embodiment of FIG. 1 may be implemented as the electronic unit 200 of FIG. 2, and each two adjacent tunable circuits may be implemented as two tunable circuits 221 and 222 of FIG. 2. In the embodiment of the disclosure, the electronic unit 200 includes a pixel circuit 210, and the two tunable circuits 221 and 222. The pixel circuit 210 is coupled to the tunable circuits 221 and 222. The pixel circuit 210 includes two scan transistors Ts1, Ts2, two de-multiplexer transistors Td1, Td2, two bias transistors Tb1, Tb2, and a storage capacitor C1. In the embodiment of the disclosure, the scan transistors Ts1, Ts2, the bias transistors Tb1, Tb2, and the de-multiplexer transistors Td1, Td2 are N-type transistors, but the disclosure is not limited thereto. The tunable circuits 221 and 222 may have different tunable characteristics, such as different resonant frequency tunable ranges. In the embodiment of the disclosure, each of the tunable circuits 221 and 222 includes a tunable component. In one embodiment of the disclosure, the tunable component may be a voltage-controlled and capacitance tunable component, such as a varactor diode. Moreover, in one embodiment of disclosure, the tunable circuit 221 and 222 may form a transmitter circuit and a receiver circuit which have different resonant frequency tunable ranges in a beam-steerable bidirectional antenna, operate independently in half-duplex operation, and include varactor diodes as the voltage-controlled and capacitance tunable component to tune resonant frequency of the transmitter and the receiver circuits.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/2. A second terminal of the de-multiplexer transistor Td1 is coupled to the bias transistor Tb1, a first terminal of the storage capacitor C1, and the tunable circuit 221. A control terminal of the de-multiplexer transistor Td1 is coupled to a control line CL1. A first terminal of the bias transistor Tb1 is coupled to a constant bias voltage Vb1. A second terminal of the bias transistor Tb1 is coupled to the second terminal of the de-multiplexer transistor Td1, the first terminal of the storage capacitor C1, and the tunable circuit 221. A control terminal of the bias transistor Tb1 is coupled to a control line CL2.

In the embodiment of the disclosure, a first terminal of the scan transistor Ts2 is coupled to the same data line DL(m). A second terminal of the scan transistor Ts2 is coupled to a first terminal of the de-multiplexer transistor Td2. A control terminal of the scan transistor Ts2 is coupled to the same scan line SL(n). A second terminal of the de-multiplexer transistor Td2 is coupled to the bias transistor Tb2, a second terminal of the storage capacitor C1, and the tunable circuit 222. A control terminal of the de-multiplexer transistor Td2 is coupled to the control line CL2. A first terminal of the bias transistor Tb2 is coupled to the second terminal of the de-multiplexer transistor Td1, the second terminal of the storage capacitor C1, and the tunable circuit 222. A second terminal of the bias transistor Tb2 is coupled to a constant bias voltage Vb2. A control terminal of the bias transistor Tb2 is coupled to the control line CL1.

In the embodiment of the disclosure, the control terminals of the scan transistors Ts1 and Ts2 receive same scan signal SS(n) from the scan line SL(n), so that the scan transistors Ts1 and Ts2 may be turned-on at the same time to receive same data signal DS(m) with a data voltage Vdata from the data line DL(m). The de-multiplexer transistors Td1 and Td2 receive different control signals CS1 and CS2 through the different control lines CL1 and CL2, and the bias transistors Tb1 and Tb2 also receive different control signals CS1 and CS2 through the different control lines CL1 and CL2.

In the embodiment of the disclosure, the de-multiplexer transistor Td1 and the bias transistor Tb2 receive the same control signal CS1, and the de-multiplexer transistor Td2 and the bias transistor Tb1 receive the same control signal CS2. The de-multiplexer transistors Td1 and Td2 may be selectively turned-on according to the control signals CS1 and CS2 to provide the data signal DS(m) with the corresponding data voltage Vdata to the storage capacitor C1, and the bias transistors Tb1 and Tb2 may also be selectively turned-on according to the control signals CS1 and CS2 to provide the constant bias voltage Vb1 or the constant bias voltage Vb2 to the storage capacitor C1. The storage capacitor C1 may receive the corresponding data voltage Vdata from the data line DL(m) with the constant bias voltage Vb1 or the constant bias voltage Vb2, so that a counter-electrode of the storage capacitor C1 may have the constant bias voltage Vb1 or the constant bias voltage Vb2.

Thus, the pixel circuit 210 may provide a driving signal with driving voltage V1 to drive the tunable circuit 221 according to the storage capacitor C1 which is applied the corresponding data voltage Vdata or the constant bias voltage Vb1, and may provide a driving signal with driving voltage V2 to drive the tunable circuit 222 according to the storage capacitor C1 which is applied the corresponding data voltage Vdata or the constant bias voltage Vb2. In other words, since the each two adjacent tunable circuits of the tunable circuits P(1,1) to P(M,N) may share the same scan line, the number of scan lines of the electronic device 100 may be effectively reduced.

Figure 3A:
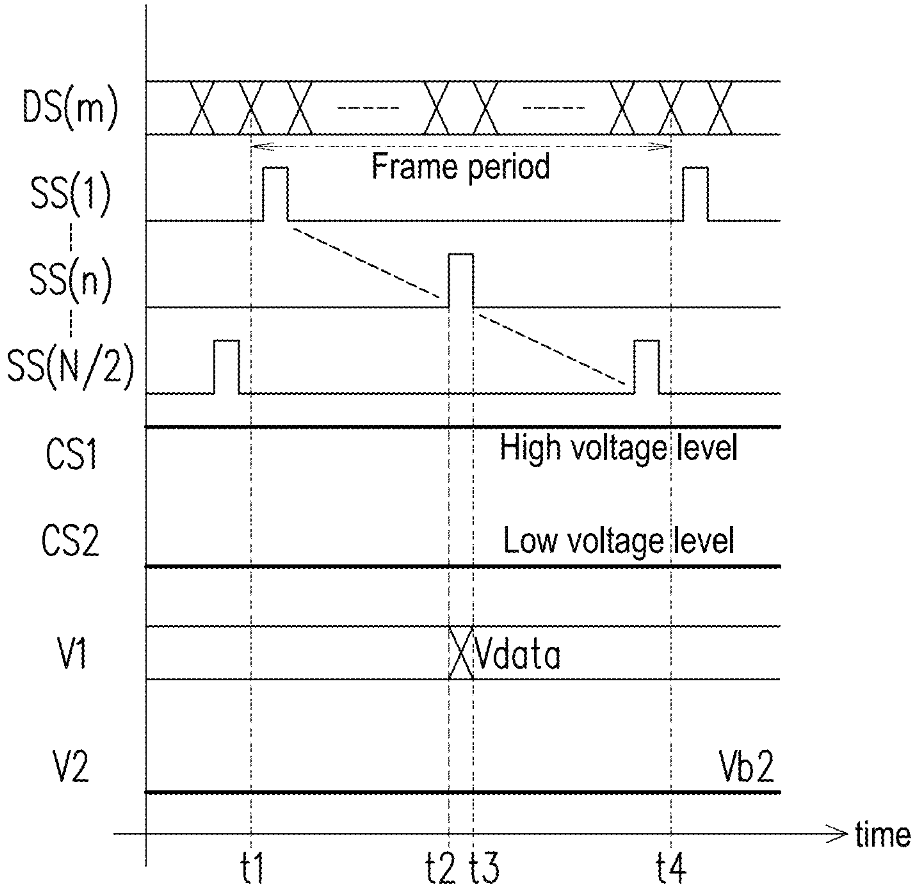
FIG. 3A is a timing diagram of relevant signals according to the embodiment of the FIG. 2.

FIG. 3A is a timing diagram of relevant signals according to the embodiment of the FIG. 2. The following embodiment assumes that the electronic unit 200 may be a (m,n)-th electronic unit, and the N/2 scan lines of the electronic device may provide the scan signals SS(1) to SS(N/2) respectively. As shown in FIG. 3A, the electronic unit 200 may receive the data signal DS(m), the scan signal SS(n), the control signals CS1 and CS2. In the embodiment of the disclosure, the signal waveforms of the control signals CS1 and CS2 are complementary. Referring to FIG. 2 and FIG. 3A, during one frame period from time t1 to time t4, the pixel circuit 210 may operate a data writing operation of the tunable circuit 221. Specifically, during a period from time t1 to time t4, the control signal CS1 may be a high voltage level, and the control signal CS2 may be a low voltage level. Thus, during the period from time t1 to time t4, the de-multiplexer transistor Td1 and the bias transistor Tb2 are turned-on, and the de-multiplexer transistor Td2 and the bias transistor Tb1 are turned-off. During a period from time t2 to time t3, the scan signal SS(n) is changed from the low voltage level to the high voltage level, so that the scan transistors Ts1 and Ts2 are turned-on. Thus, during the period from time t2 to time t3, the de-multiplexer transistor Td1 may provide the data signal DS(m) with the corresponding data voltage Vdata to the first terminal of the storage capacitor C1, and the bias transistor Tb2 may provide the constant bias voltage Vb2 to the second terminal of the storage capacitor C1, so that the storage capacitor C1 may store the data signal DS(m) with the corresponding data voltage Vdata. The storage capacitor C1 may receive the corresponding data voltage Vdata from the data line DL(m) with the constant bias voltage Vb2, so that a counter-electrode of the storage capacitor C1 may have the constant bias voltage Vb2. Thus, the pixel circuit 210 may provide the driving signal with driving voltage V1 to drive the tunable circuit 221 according to the corresponding data voltage Vdata currently stored in the storage capacitor C1, and the pixel circuit 210 may provide the driving signal with driving voltage V2 to drive the tunable circuit 222 according to the constant bias voltage Vb2 provided by the bias transistor Tb2. Furthermore, during the period from time t2 to time t3, the de-multiplexer transistor Td2 is turned-off, and does not provide the data signal DS(m) to the second terminal of the storage capacitor C1. The bias transistor Tb1 is also turned-off, and does not provide the constant bias voltage Vb1 to the first terminal of the storage capacitor C1.

Figure 3B:
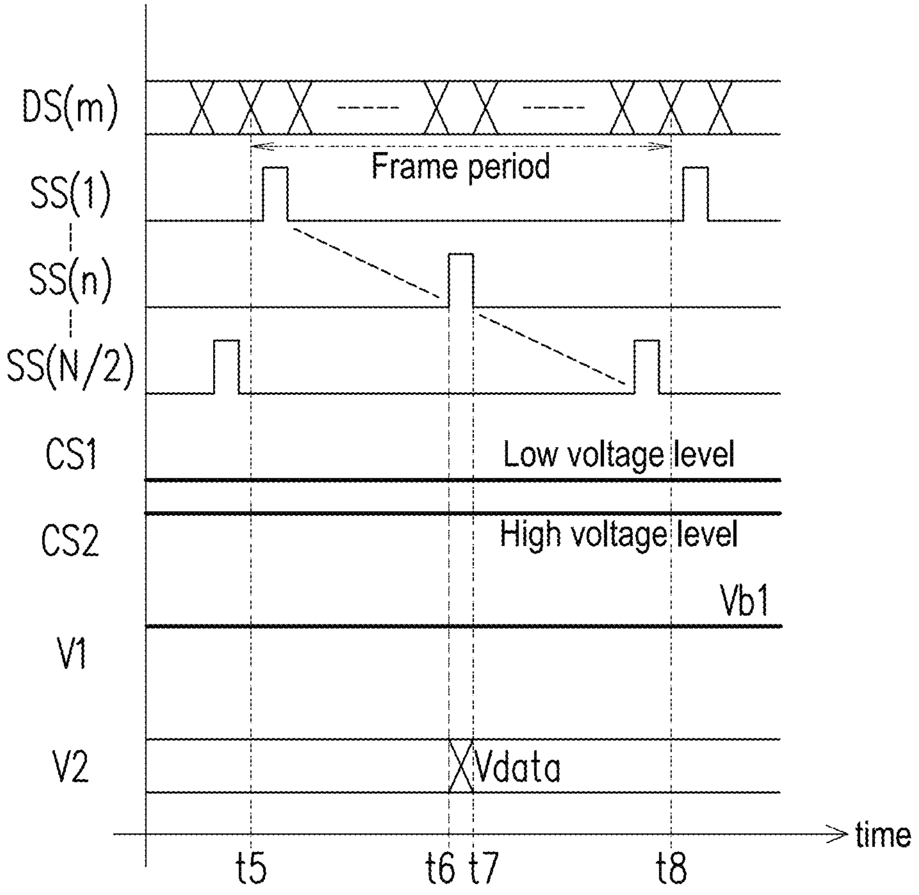
FIG. 3B is a timing diagram of relevant signals according to the embodiment of the FIG. 2.

FIG. 3B is a timing diagram of relevant signals according to the embodiment of the FIG. 2. Referring to FIG. 2 and FIG. 3B, during another one frame period from time t5 to time t8, the pixel circuit 210 may operate a data writing operation of the tunable circuit 222. Specifically, during a period from time t5 to time t8, the control signal CS2 may be changed to the high voltage level, and the control signal may be changed to the low voltage level. Thus, during the period from time t5 to time t8, the de-multiplexer transistor Td2 and the bias transistor Tb1 are turned-on, and the de-multiplexer transistor Td1 and the bias transistor Tb2 are turned-off. During a period from time t6 to time t7, the scan signal SS(n) is changed from the low voltage level to the high voltage level, so that the scan transistors Ts1 and Ts2 are turned-on. Thus, during the period from time t6 to time t7, the de-multiplexer transistor Td2 may provide the data signal DS(m) with the corresponding data voltage Vdata to the second terminal of the storage capacitor C1, and the bias transistor Tb1 may provide the constant bias voltage Vb1 to the first terminal of the storage capacitor C1, so that the storage capacitor C1 may store the data signal DS(m) with the corresponding data voltage Vdata. The storage capacitor C1 may receive the corresponding data voltage Vdata from the data line DL(m) with the constant bias voltage Vb1, so that a counter-electrode of the storage capacitor C1 may have the constant bias voltage Vb1. Thus, the pixel circuit 210 may provide the driving signal with driving voltage V2 to drive the tunable circuit 222 according to the corresponding data voltage Vdata currently stored in the storage capacitor C1, and the pixel circuit 210 may provide the driving signal with driving voltage V1 to drive the tunable circuit 221 according to the constant bias voltage Vb1 provided by the bias transistor Tb1. Furthermore, during the period from time t6 to time t7, the de-multiplexer transistor Td1 is turned-off, and does not provide the data signal DS(m) to the first terminal of the storage capacitor C1. The bias transistor Tb2 is also turned-off, and does not provide the constant bias voltage Vb2 to the second terminal of the storage capacitor C1.

Based on FIG. 3A and FIG. 3B, the turn-on periods of the de-multiplexer transistors Td1 and Td2 are non-overlapping, and the turn-on periods of the bias transistors Tb1 and Tb2 are also non-overlapping. Therefore, the pixel circuit 210 may selectively drive the tunable circuit 221 or the tunable circuit 222 according to control signals CS1 and CS2 in different frame periods to realize an efficient driving of the tunable circuit 221 or the tunable circuit 222 with a selective scanning in which the corresponding data voltage Vdata may be applied to a working tunable circuit (i.e. the tunable circuit 221 or the tunable circuit 222) and the corresponding constant bias voltage may be applied to a non-working tunable circuit (i.e. the tunable circuit 222 or the tunable circuit 221).

Moreover, for the transmitter circuits and the receiver circuits of the beam-steerable bidirectional antenna device, the pixel circuit 210 may selectively apply the corresponding data voltage Vdata to the transmitter circuit or the receiver circuit as a working tunable circuit and apply the corresponding constant bias voltage to the other as a non-working tunable circuit with the selective scanning, which contribute a fast beam-steering by data writing of the transmitter circuits or the receiver circuits for half-duplex operation of the beam-steerable bidirectional antenna device.

Figure 4:
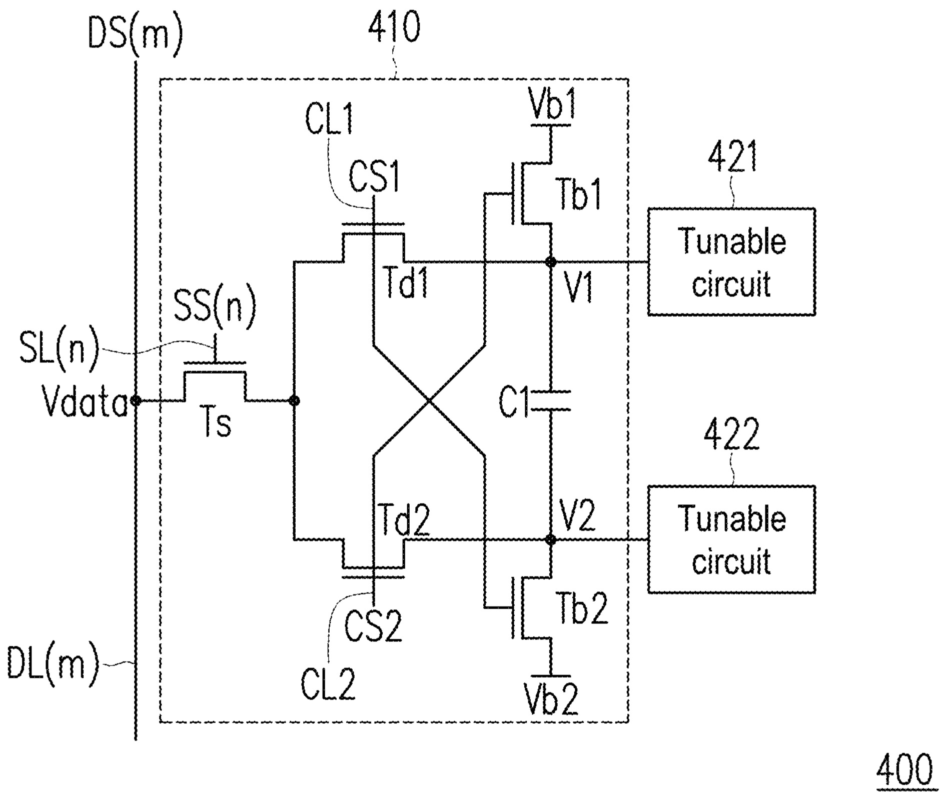
FIG. 4 is a schematic diagram of an electronic unit according to an embodiment of the disclosure.

FIG. 4 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 4, each of the electronic units of the above embodiment of FIG. 1 may be implemented as the electronic unit 400 of FIG. 4, and each two adjacent tunable circuits may be implemented as two tunable circuits 421 and 422 of FIG. 4. In the embodiment of the disclosure, the electronic unit 400 includes a pixel circuit 410, and the two tunable circuits 421 and 422. The pixel circuit 410 is coupled to the tunable circuits 421 and 422. The pixel circuit 410 includes one scan transistor Ts, two de-multiplexer transistors Td1, Td2, two bias transistors Tb1, Tb2, and a storage capacitor C1.

In the embodiment of the disclosure, a first terminal of the scan transistor Ts is coupled to a data line DL(m), where m is between 1 to M. A second terminal of the scan transistor Ts is coupled to a first terminal of the de-multiplexer transistor Td1 and a first terminal of the de-multiplexer transistor Td2. A control terminal of the scan transistor Ts is coupled to a scan line SL(n), where n is between 1 to N/2. A second terminal of the de-multiplexer transistor Td1 is coupled to the bias transistor Tb1, a first terminal of the storage capacitor C1, and the tunable circuit 421. A control terminal of the de-multiplexer transistor Td1 is coupled to a control line CL1. A first terminal of the bias transistor Tb1 is coupled to a constant bias voltage Vb1. A second terminal of the bias transistor Tb1 is coupled to the second terminal of the de-multiplexer transistor Td1, the first terminal of the storage capacitor C1, and the tunable circuit 421. A control terminal of the bias transistor Tb1 is coupled to a control line CL2.

A second terminal of the de-multiplexer transistor Td2 is coupled to the bias transistor Tb2, a second terminal of the storage capacitor C1, and the tunable circuit 422. A control terminal of the de-multiplexer transistor Td2 is coupled to the control line CL2. A first terminal of the bias transistor Tb2 is coupled to the second terminal of the de-multiplexer transistor Td1, the second terminal of the storage capacitor C1, and the tunable circuit 422. A second terminal of the bias transistor Tb2 is coupled to a constant bias voltage Vb2. A control terminal of the bias transistor Tb2 is coupled to the control line CL1.

In the embodiment of the disclosure, the control terminal of the scan transistor Ts receives a scan signal SS(n) from the scan line SL(n), so that the scan transistor Ts may be turned-on to receive a data signal DS(m) with a data voltage Vdata from the data line DL(m). The de-multiplexer transistors Td1 and Td2 receive different control signals CS1 and CS2 through the different control lines CL1 and CL2, and the bias transistors Tb1 and Tb2 also receive different control signals CS1 and CS2 through the different control lines CL1 and CL2.

In the embodiment of the disclosure, the de-multiplexer transistor Td1 and the bias transistor Tb2 receive the same control signal CS1, and the de-multiplexer transistor Td2 and the bias transistor Tb1 receive the same control signal CS2. The de-multiplexer transistors Td1 and Td2 may be selectively turned-on according to the control signals CS1 and CS2 to provide the data signal DS(m) with the corresponding data voltage Vdata to the storage capacitor C1, and the bias transistors Tb1 and Tb2 may also be selectively turned-on according to the control signals CS1 and CS2 to provide the constant bias voltage Vb1 or the constant bias voltage Vb2 to the storage capacitor C1, so that a counter-electrode of the storage capacitor C1 may have the constant bias voltage Vb1 or the constant bias voltage Vb2. The storage capacitor C1 may receive the corresponding data voltage Vdata from the data line DL(m).

Thus, the pixel circuit 410 may provide a driving signal with driving voltage V1 to drive the tunable circuit 421 according to the storage capacitor C1 which is applied the corresponding data voltage Vdata or the constant bias voltage Vb1, and may provide a driving signal with driving voltage V2 to drive the tunable circuit 422 according to the storage capacitor C1 which is applied the corresponding data voltage Vdata or the constant bias voltage Vb2. In other words, since the each two adjacent tunable circuits of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

In the embodiment of the disclosure, the relevant signals of FIG. 3A and FIG. 3B may also be applied to the electronic unit 400, therefore the pixel circuit 410 may also selectively drive the tunable circuit 421 or the tunable circuit 422 according to control signals CS1 and CS2 in different frame periods to realize an efficient driving of the tunable circuit 421 or the tunable circuit 422 with a selective scanning in which the corresponding data voltage Vdata may be applied to a working tunable circuit (i.e. the tunable circuit 421 or the tunable circuit 422) and the constant bias voltage may be applied to a non-working tunable circuit (i.e. the tunable circuit 422 or the tunable circuit 421).

Moreover, for the transmitter circuits and the receiver circuits of the beam-steerable bidirectional antenna device, the pixel circuit 410 may selectively apply the corresponding data voltage Vdata to the transmitter circuit or the receiver circuit as a working tunable circuit and apply the corresponding constant bias voltage to the other as a non-working tunable circuit with the selective scanning, which contribute a fast beam-steering by data writing of the transmitter circuits or the receiver circuits for half-duplex operation of the beam-steerable bidirectional antenna device.

Figure 5:
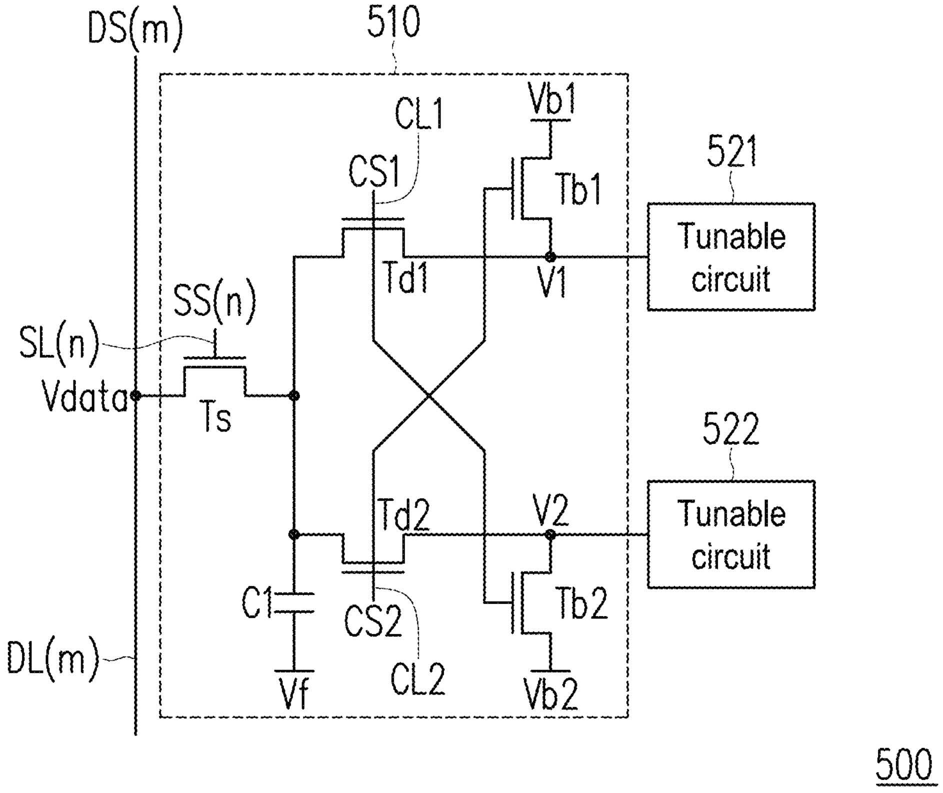
FIG. 5 is a schematic diagram of an electronic unit according to an embodiment of the disclosure.

FIG. 5 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 5, each of the electronic units of the above embodiment of FIG. 1 may be implemented as the electronic unit 500 of FIG. 5, and each two adjacent tunable circuits may be implemented as two tunable circuits 521 and 522 of FIG. 5. In the embodiment of the disclosure, the electronic unit 500 includes a pixel circuit 510, and the two tunable circuits 521 and 522. The pixel circuit 510 is coupled to the tunable circuits 521 and 522. The pixel circuit 510 includes one scan transistor Ts, two de-multiplexer transistors Td1, Td2, two bias transistors Tb1, Tb2, and a storage capacitor C1.

In the embodiment of the disclosure, a first terminal of the scan transistor Ts is coupled to a data line DL(m), where m is between 1 to M. A second terminal of the scan transistor Ts is coupled to a first terminal of the storage capacitor C1, a first terminal of the de-multiplexer transistor Td1, and a first terminal of the de-multiplexer transistor Td2. A control terminal of the scan transistor Ts is coupled to a scan line SL(n), where n is between 1 to N/2. A second terminal of the de-multiplexer transistor Td1 is coupled to the bias transistor Tb1 and the tunable circuit 521. A control terminal of the de-multiplexer transistor Td1 is coupled to a control line CL1. A first terminal of the bias transistor Tb1 is coupled to a constant bias voltage Vb1. A second terminal of the bias transistor Tb1 is coupled to the second terminal of the de-multiplexer transistor Td1 and the tunable circuit 521. A control terminal of the bias transistor Tb1 is coupled to a control line CL2. A second terminal of the storage capacitor C1 is coupled to a constant voltage source Vf.

A second terminal of the de-multiplexer transistor Td2 is coupled to the bias transistor Tb2 and the tunable circuit 522. A control terminal of the de-multiplexer transistor Td2 is coupled to the control line CL2. A first terminal of the bias transistor Tb2 is coupled to the second terminal of the de-multiplexer transistor Td2 and the tunable circuit 522. A second terminal of the bias transistor Tb2 is coupled to a constant bias voltage Vb2. A control terminal of the bias transistor Tb2 is coupled to the control line CL1.

In the embodiment of the disclosure, the control terminal of the scan transistor Ts receives a scan signal SS(n) from the scan line SL(n), so that the scan transistor Ts may be turned-on to receive a data signal DS(m) with a corresponding data voltage Vdata from the data line DL(m) and store the data voltage Vdata into the storage capacitor C1. The de-multiplexer transistors Td1 and Td2 receive different control signals CS1 and CS2 through the different control lines CL1 and CL2, and the bias transistors Tb1 and Tb2 also receive different control signals CS1 and CS2 through the different control lines CL1 and CL2.

In the embodiment of the disclosure, the de-multiplexer transistor Td1 and the bias transistor Tb2 receive the same control signal CS1, and the de-multiplexer transistor Td2 and the bias transistor Tb1 receive the same control signal CS2. The de-multiplexer transistors Td1 and Td2 may be selectively turned-on according to the control signals CS1 and CS2 to selectively transmit the corresponding data voltage Vdata from the storage capacitor C1 to the tunable circuit 521 or the tunable circuit 522, and the bias transistors Tb1 and Tb2 may also be selectively turned-on according to the control signals CS1 and CS2 to provide the constant bias voltage Vb1 to the tunable circuit 521 and the constant bias voltage Vb2 to the tunable circuit 522, respectively.

Thus, the pixel circuit 510 may provide a driving signal with driving voltage V1 to drive the tunable circuit 521 according to the storage capacitor C1 which is applied the corresponding data voltage Vdata or according to the bias transistor Tb1 which is applied the constant bias voltage Vb1, and may provide a driving signal with driving voltage V2 to drive the tunable circuit 522 according to the storage capacitor C1 which is applied the corresponding data voltage Vdata or according to the bias transistor Tb2 which is applied the constant bias voltage Vb2. In other words, since the each two adjacent tunable circuits of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

In the embodiment of the disclosure, the relevant signals of FIG. 3A and FIG. 3B may also be applied to the electronic unit 500, therefore the pixel circuit 510 may also selectively drive the tunable circuit 521 or the tunable circuit 522 according to control signals CS1 and CS2 in different frame periods to realize an efficient driving of the tunable circuit 521 or the tunable circuit 522 with a selective scanning in which the corresponding data voltage Vdata may be applied to a working tunable circuit (i.e. the tunable circuit 521 or the tunable circuit 522) and the constant bias voltage may be applied to a non-working tunable circuit. (i.e. the tunable circuit 522 or the tunable circuit 521). Moreover, for the transmitter circuits and the receiver circuits of the beam-steerable bidirectional antenna device, the pixel circuit 510 may selectively apply the corresponding data voltage Vdata to the transmitter circuit or the receiver circuit as a working tunable circuit and apply the corresponding constant bias voltage to the other as a non-working tunable circuit with the selective scanning, which contribute a fast beam-steering by data writing of the transmitter circuits or the receiver circuits for half-duplex operation of the beam-steerable bidirectional antenna device.

Figure 6:
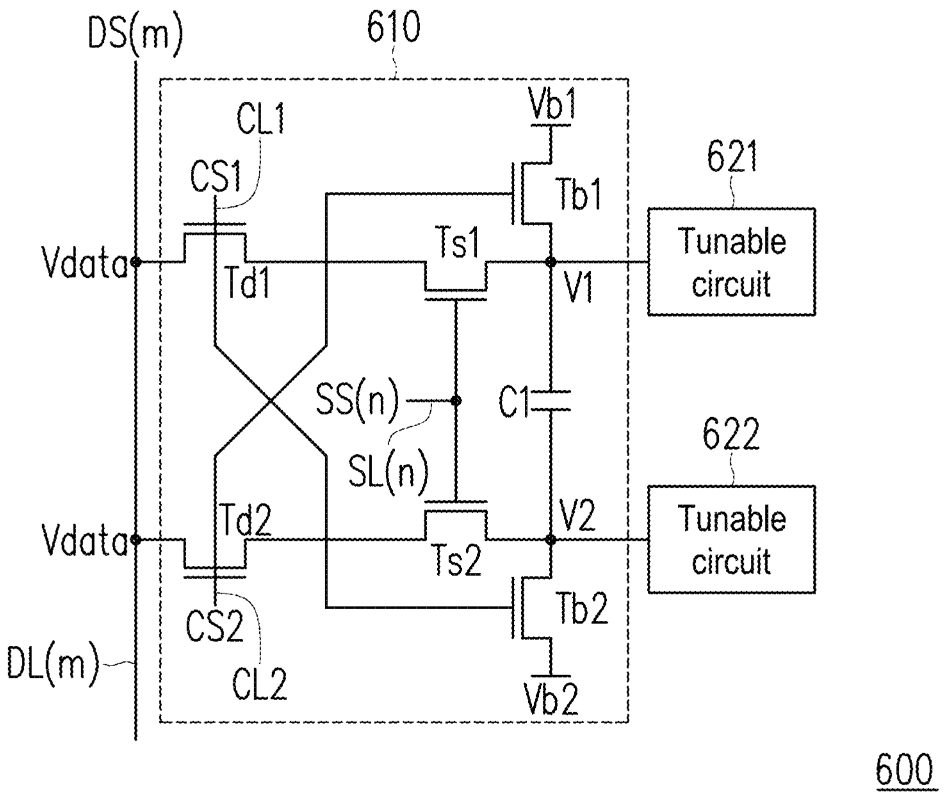
FIG. 6 is a schematic diagram of an electronic unit according to an embodiment of the disclosure.

FIG. 6 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 6, each of the electronic units of the above embodiment of FIG. 1 may be implemented as the electronic unit 600 of FIG. 6, and each two adjacent tunable circuits may be implemented as two tunable circuits 621 and 622 of FIG. 6. In the embodiment of the disclosure, the electronic unit 600 includes a pixel circuit 610, and the two tunable circuits 621 and 622. The pixel circuit 610 is coupled to the tunable circuits 621 and 622. The pixel circuit 610 includes two scan transistors Ts1, Ts2, two de-multiplexer transistors Td1, Td2, two bias transistors Tb1, Tb2, and a storage capacitor C1.

In the embodiment of the disclosure, a first terminal of the de-multiplexer transistor Td1 is coupled to a data line DL(m), where m is between 1 to M. A second terminal of the de-multiplexer transistor Td1 is coupled to a first terminal of the scan transistor Ts1. A control terminal of the de-multiplexer transistor Td1 is coupled to a control line CL1. A second terminal of the scan transistor Ts1 is coupled to the bias transistor Tb1, a first terminal of the storage capacitor C1, and the tunable circuit 621. A control terminal of the scan transistor Ts1 is coupled to a scan line SL(n), where n is between 1 to N/2. A first terminal of the bias transistor Tb1 is coupled to a constant bias voltage Vb1. A second terminal of the bias transistor Tb1 is coupled to the second terminal of the scan transistor Ts1, the first terminal of the storage capacitor C1, and the tunable circuit 621. A control terminal of the bias transistor Tb1 is coupled to a control line CL2.

In the embodiment of the disclosure, a first terminal of the de-multiplexer transistor Td2 is coupled to the data line DL(m). A second terminal of the de-multiplexer transistor Td2 is coupled to a first terminal of the scan transistor Ts2. A control terminal of the de-multiplexer transistor Td2 is coupled to a control line CL2. A second terminal of the scan transistor Ts2 is coupled to the bias transistor Tb2, a second terminal of the storage capacitor C1, and the tunable circuit 622. A control terminal of the scan transistor Ts2 is coupled to the scan line SL(n). A first terminal of the bias transistor Tb2 is coupled to the second terminal of the scan transistor Ts2, the first terminal of the storage capacitor C2, and the tunable circuit 622. A second terminal of the bias transistor Tb2 is coupled to a constant bias voltage Vb2. A control terminal of the bias transistor Tb2 is coupled to a control line CL1.

In the embodiment of the disclosure, the control terminals of the scan transistors Ts1 and Ts2 receive same scan signal SS(n) from the scan line SL(n), so that the scan transistors Ts1 and Ts2 may be turned-on at the same time. The de-multiplexer transistors Td1 and Td2 receive different control signals CS1 and CS2 through the different control lines CL1 and CL2, and the bias transistors Tb1 and Tb2 also receive different control signals CS1 and CS2 through the different control lines CL1 and CL2.

In the embodiment of the disclosure, the de-multiplexer transistor Td1 and the bias transistor Tb2 receive the same control signal CS1, and the de-multiplexer transistor Td2 and the bias transistor Tb1 receive the same control signal CS2. The de-multiplexer transistors Td1 and Td2 may be selectively turned-on according to the control signals CS1 and CS2 to provide the data signal DS(m) with the corresponding data voltage Vdata to the storage capacitor C1 through the scan transistor Ts1 or the scan transistor Ts2 respectively, and the bias transistors Tb1 and Tb2 may also be selectively turned-on according to the control signals CS1 and CS2 to provide the constant bias voltage Vb1 or the constant bias voltage Vb2 to the storage capacitor C1. The storage capacitor C1 may receive the corresponding data voltage Vdata from the data line DL(m), so that a counter-electrode of the storage capacitor C1 may have the constant bias voltage Vb1 or the constant bias voltage Vb2.

Thus, the pixel circuit 610 may provide a driving signal with driving voltage V1 to drive the tunable circuit 621 according to the storage capacitor C1 which is applied the corresponding data voltage Vdata or the constant bias voltage Vb1, and may provide a driving signal with driving voltage V2 to drive the tunable circuit 622 according to the storage capacitor C1 which is applied the corresponding data voltage Vdata or the constant bias voltage Vb1. In other words, since the each two adjacent tunable circuits of the tunable circuits P(1,1) to P(M,N) may share the same scan line, the number of scan lines of the electronic device 100 may be effectively reduced.

In the embodiment of the disclosure, the relevant signals of FIG. 3A and FIG. 3B may also be applied to the electronic unit 600, therefore the pixel circuit 610 may also selectively drive the tunable circuit 621 or the tunable circuit 622 according to control signals CS1 and CS2 in different frame periods to realize an efficient driving of the tunable circuit 621 or the tunable circuit 622 with a selective scanning in which the corresponding data voltage Vdata may be applied to a working tunable circuit (i.e. the tunable circuit 621 or the tunable circuit 622) and the constant bias voltage may be applied to a non-working tunable circuit (i.e. the tunable circuit 622 or the tunable circuit 621). Moreover, for the transmitter circuits and the receiver circuits of the beam-steerable bidirectional antenna device, the pixel circuit 610 may selectively apply the corresponding data voltage Vdata to the transmitter circuit or the receiver circuit as a working tunable circuit and apply the corresponding constant bias voltage to the other as a non-working tunable circuit with the selective scanning, which contribute a fast beam-steering by data writing of the transmitter circuits or the receiver circuits for half-duplex operation of the beam-steerable bidirectional antenna device.

Figure 7:
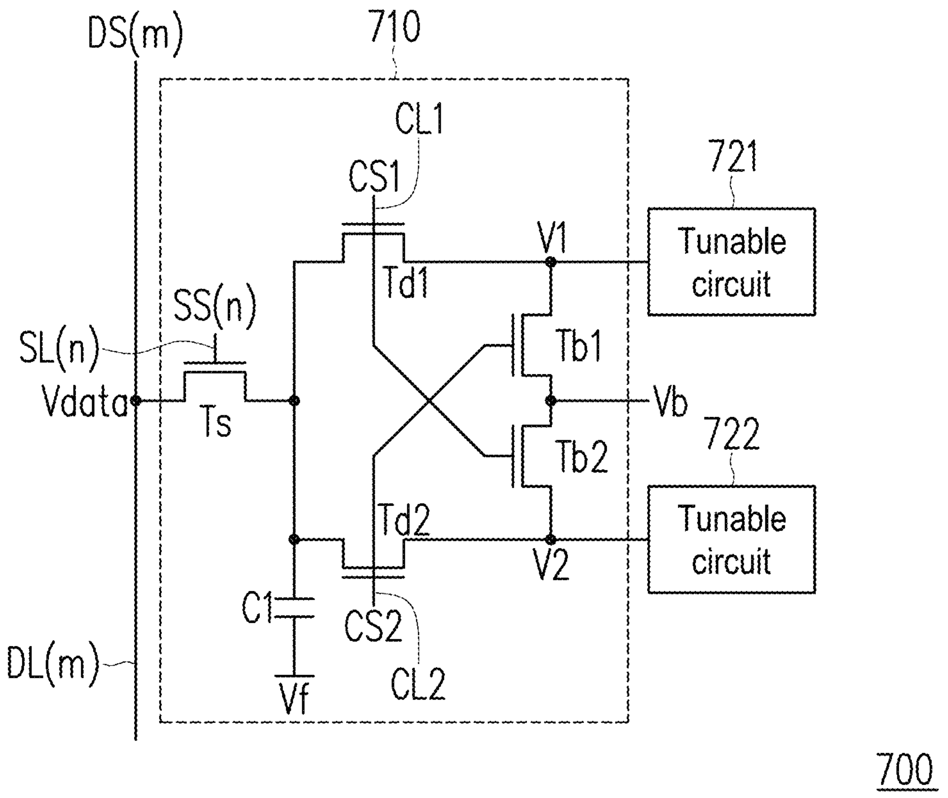
FIG. 7 is a schematic diagram of an electronic unit according to an embodiment of the disclosure.

FIG. 7 is a schematic diagram of an electronic unit according to an embodiment of the disclosure. The following embodiment assumes that the electronic device 100 of FIG. 1 may have M data lines and N/2 scan lines for driving the tunable circuits P(1, 1) to P(M,N). Referring to FIG. 7, each of the electronic units of the above embodiment of FIG. 1 may be implemented as the electronic unit 700 of FIG. 7, and each two adjacent tunable circuits may be implemented as two tunable circuits 721 and 722 of FIG. 7. In the embodiment of the disclosure, the electronic unit 700 includes a pixel circuit 710, and the two tunable circuits 721 and 722. The pixel circuit 710 is coupled to the tunable circuits 721 and 722. The pixel circuit 710 includes one scan transistor Ts, two de-multiplexer transistors Td1, Td2, two bias transistors Tb1, Tb2, and a storage capacitor C1.

In the embodiment of the disclosure, a first terminal of the scan transistor Ts is coupled to a data line DL(m), where m is between 1 to M. A second terminal of the scan transistor Ts is coupled to a first terminal of the storage capacitor C1, a first terminal of the de-multiplexer transistor Td1, and a first terminal of the de-multiplexer transistor Td2. A control terminal of the transistor Ts is coupled to a scan line SL(n), where n is between 1 to N/2. A second terminal of the de-multiplexer transistor Td1 is coupled to the bias transistor Tb1 and the tunable circuit 721. A control terminal of the de-multiplexer transistor Td1 is coupled to a control line CL1. A first terminal of the bias transistor Tb1 is coupled to a two-level voltage source Vb. A second terminal of the bias transistor Tb1 is coupled to the second terminal of the de-multiplexer transistor Td1 and the tunable circuit 721. A control terminal of the bias transistor Tb1 is coupled to a control line CL2. A second terminal of the storage capacitor C1 is coupled to a constant voltage source Vf.

A second terminal of the de-multiplexer transistor Td2 is coupled to the bias transistor Tb2 and the tunable circuit 722. A control terminal of the de-multiplexer transistor Td2 is coupled to the control line CL2. A first terminal of the bias transistor Tb2 is coupled to the second terminal of the de-multiplexer transistor Td2 and the tunable circuit 722. A second terminal of the bias transistor Tb2 is coupled to the two-level voltage source Vb. A control terminal of the bias transistor Tb2 is coupled to the control line CL1.

In the embodiment of the disclosure, the control terminal of the scan transistor Ts receives a scan signal SS(n) from the scan line SL(n), so that the scan transistor Ts may be turned-on to receive a data signal DS(m) with a corresponding data voltage Vdata from the data line DL(m) and store the data voltage Vdata into the storage capacitor C1. The de-multiplexer transistors Td1 and Td2 receive different control signals CS1 and CS2 through the different control lines CL1 and CL2, and the bias transistors Tb1 and Tb2 also receive different control signals CS1 and CS2 through the different control lines CL1 and CL2.

In the embodiment of the disclosure, the de-multiplexer transistor Td1 and the bias transistor Tb2 receive the same control signal CS1, and the de-multiplexer transistor Td2 and the bias transistor Tb1 receive the same control signal CS2. The de-multiplexer transistors Td1 and Td2 may be selectively turned-on according to the control signals CS1 and CS2 to selectively transmit the corresponding data voltage Vdata from the storage capacitor C1 to the tunable circuit 721 or the tunable circuit 722, and the bias transistors Tb1 and Tb2 may also be selectively turned-on according to the control signals CS1 and CS2 to provide a corresponding constant bias voltage from the two-level voltage source Vb to the tunable circuit 721 or the tunable circuit 722 selectively.

Thus, the pixel circuit 710 may provide a driving signal with driving voltage V1 to drive the tunable circuit 721 according to the storage capacitor C1 or according to the two-level voltage source Vb provided by the bias transistor Tb1, and may provide a driving signal with driving voltage V2 to drive the tunable circuit 722 according to the storage capacitor C1 or according to the two-level voltage source Vb provided by the bias transistor Tb2. In other words, since the each two adjacent tunable circuits of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

Figure 8A:
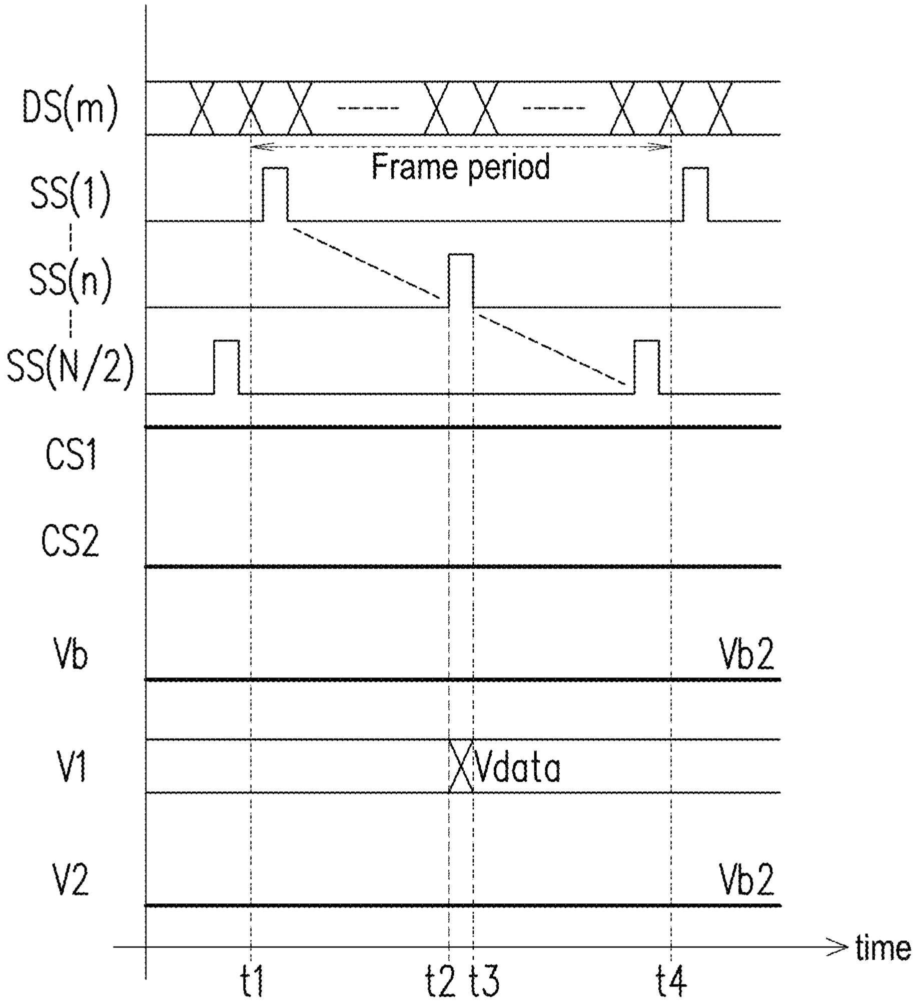
FIG. 8A is a timing diagram of relevant signals according to the embodiment of the FIG. 7.

FIG. 8A is a timing diagram of relevant signals according to the embodiment of the FIG. 7. The following embodiment assumes that the electronic unit 700 may be a (m,n)-th electronic unit, and the N/2 scan lines of the electronic device may provide the scan signals SS(1) to SS(N/2) respectively. As shown in FIG. 8A, the electronic unit 700 may receive the data signal DS(m), the scan signal SS(n), the control signals CS1 and CS2. In the embodiment of the disclosure, the signal waveforms of the control signals CS1 and CS2 are complementary. Referring to FIG. 7 and FIG. 8A, during one frame period from time t1 to time t4, the pixel circuit 710 may operate a data writing operation of the tunable circuit 721. Specifically, during a period from time t1 to time t4, the control signal CS1 may be a high voltage level, and the control signal CS2 may be a low voltage level. Thus, during the period from time t1 to time t4, the de-multiplexer transistor Td1 and the bias transistor Tb2 are turned-on, and the de-multiplexer transistor Td2 and the bias transistor Tb1 are turned-off. During a period from time t2 to time t3, the scan signal SS(n) is changed from the low voltage level to the high voltage level, so that the scan transistor Ts is turned-on. The scan transistor Ts may provide the data signal DS(m) with the corresponding data voltage Vdata to the storage capacitor C1.

Thus, during the period from time t1 to time t4, the de-multiplexer transistor Td1 may provide the data signal DS(m) with the corresponding data voltage Vdata from the first terminal of the storage capacitor C1 to the tunable circuit 721, and the bias transistor Tb2 may provide a constant bias voltage Vb2 from the two-level voltage source Vb to the tunable circuit 722. Thus, the pixel circuit 710 may provide the driving signal with driving voltage V1 to drive the tunable circuit 721 according to the corresponding data voltage Vdata currently stored in the storage capacitor C1, and may provide the driving signal with driving voltage V2 to drive the tunable circuit 722 according to the constant bias voltage Vb2 currently provided by the two-level voltage source Vb. Furthermore, during the period from time t1 to time t4, the de-multiplexer transistor Td2 and the bias transistor Tb1 are turned-off.

In one embodiment of the disclosure, the two-level voltage source Vb may be switched by the control signals CS1 and CS2 to selectively provide the constant bias voltage Vb2.

Figure 8B:
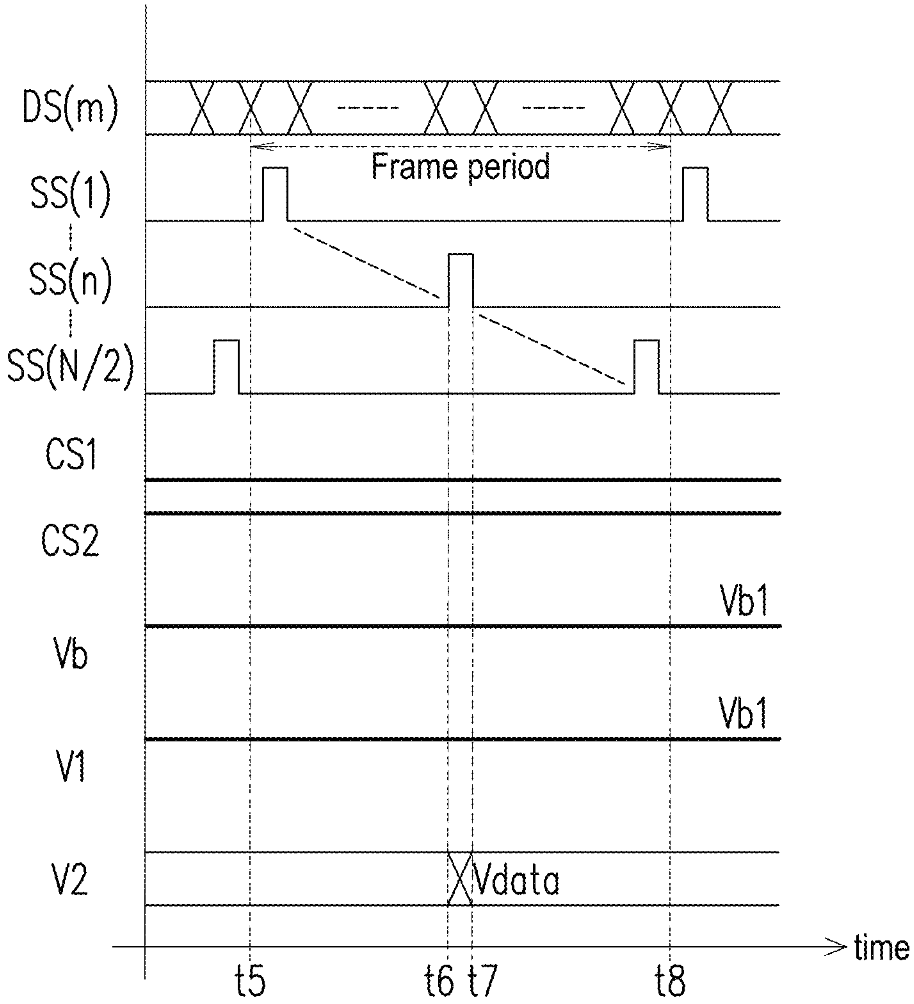
FIG. 8B is a timing diagram of relevant signals according to the embodiment of the FIG. 7.

FIG. 8B is a timing diagram of relevant signals according to the embodiment of the FIG. 7. Referring to FIG. 7 and FIG. 8B, during one frame period from time t5 to time t8, the pixel circuit 710 may operate a data writing operation of the tunable circuit 722. Specifically, during a period from time t5 to time t8, the control signal CS2 may be changed to a high voltage level, and the control signal CS1 may be changed to a low voltage level. Thus, during the period from time t5 to time t8 the de-multiplexer transistor Td2 and the bias transistor Tb1 are turned-on, and the de-multiplexer transistor Td1 and the bias transistor Tb2 are turned-off. During a period from time t6 to time t7, the scan signal SS(n) is changed from the low voltage level to the high voltage level, so that the scan transistor Ts is turned-on. The scan transistor Ts may provide the data signal DS(m) with the corresponding data voltage Vdata to the storage capacitor C1.

Thus, during the period from time t5 to time t8, the de-multiplexer transistor Td2 may provide the data signal DS(m) with the corresponding data voltage Vdata from the first terminal of the storage capacitor C1 to the tunable circuit 722, and the bias transistor Tb1 may provide a constant bias voltage Vb1 from the two-level voltage source Vb to the tunable circuit 721. Thus, the pixel circuit 710 may provide the driving signal with driving voltage V2 to drive the tunable circuit 722 according to the corresponding data voltage Vdata currently stored in the storage capacitor C1, and may provide the driving signal with driving voltage V1 to drive the tunable circuit 721 according to the constant bias voltage Vb1 currently provided by the two-level voltage source Vb. Furthermore, during the period from time t5 to time t8, the de-multiplexer transistor Td1 and the bias transistor Tb2 are turned-off.

In one embodiment of the disclosure, the two-level voltage source Vb may be switched by the control signals CS1 and the control signal CS2 to selectively provide the constant bias voltage Vb1.

Based on FIG. 8A and FIG. 8B, the turn-on periods of the de-multiplexer transistors Td1 and Td2 are non-overlapping, and the turn-on periods of the bias transistors Tb1 and Tb2 are also non-overlapping. Therefore, the pixel circuit 710 may selectively drive the tunable circuit 721 or the tunable circuit 722 according to control signals CS1 and CS2 in different frame periods to realize an efficient driving of the tunable circuit 721 or the tunable circuit 722 with a selective scanning in which the corresponding data voltage Vdata may be applied to a working tunable circuit (i.e. the tunable circuit 721 or the tunable circuit 722) and the corresponding constant bias voltage may be applied to a non-working tunable circuit (i.e. the tunable circuit 722 or the tunable circuit 721).

Moreover, for the transmitter circuits and the receiver circuits of the beam-steerable bidirectional antenna device, the pixel circuit 710 may selectively apply the corresponding data voltage Vdata to the transmitter circuit or the receiver circuit as a working tunable circuit and apply the corresponding constant bias voltage to the other as a non-working tunable circuit with the selective scanning, which contribute a fast beam-steering by data writing of the transmitter circuits or the receiver circuits for half-duplex operation of the beam-steerable bidirectional antenna device.

Figure 9:
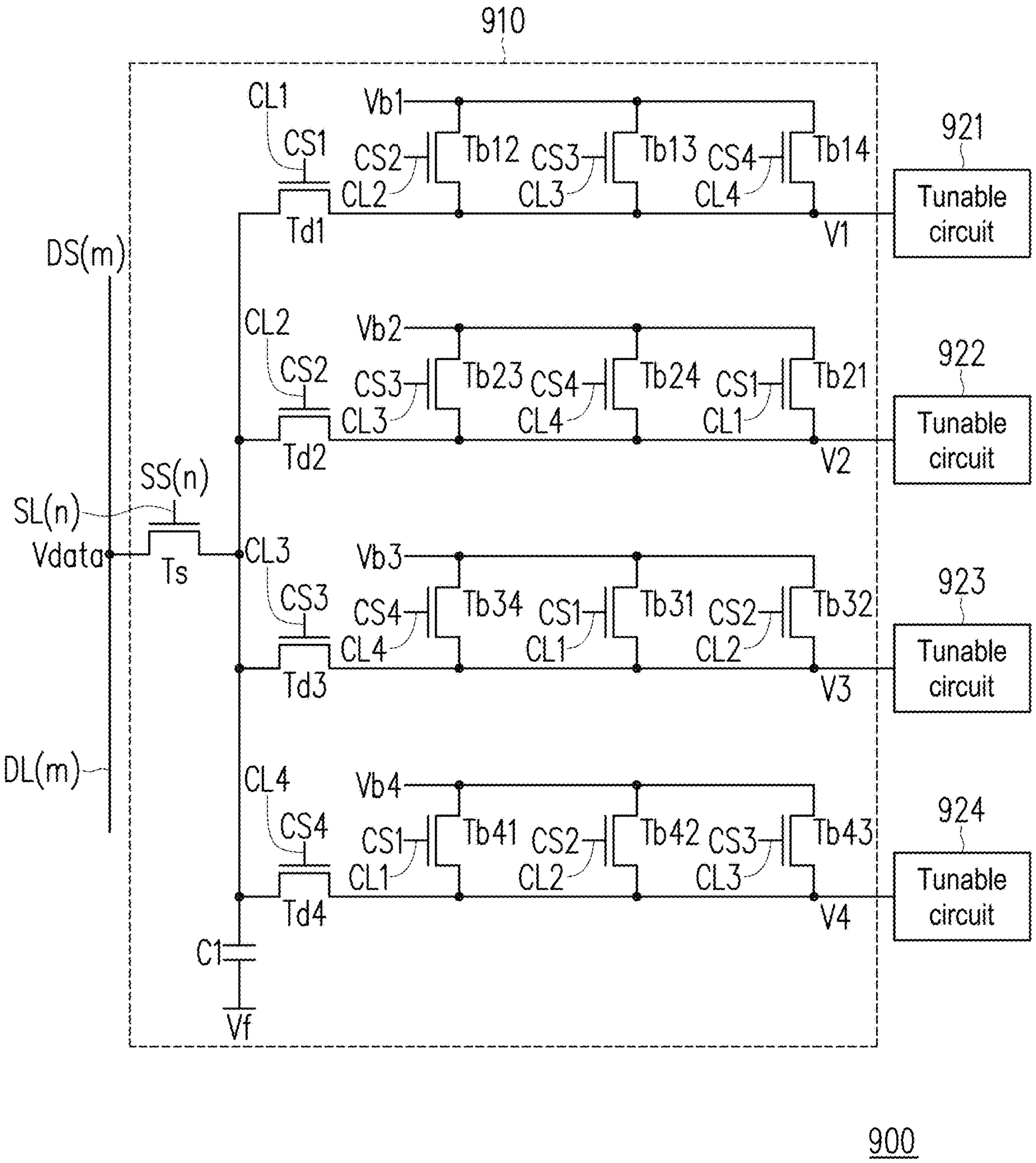
FIG. 9 is a schematic diagram of an electronic unit according to an embodiment of the disclosure.

FIG. 9 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 9, each of the electronic units of the above embodiment of FIG. 1 may be implemented as the electronic unit 900 of FIG. 9, and each four adjacent tunable circuits may be implemented as four tunable circuits 921 to 924 of FIG. 9. In the embodiment of the disclosure, the electronic unit 900 includes a pixel circuit 910, and the four tunable circuits 921 to 924. The pixel circuit 910 is coupled to the tunable circuits 921 to 924. The pixel circuit 910 includes one scan transistor Ts, four de-multiplexer transistors Td1 to Td4, twelve bias transistors Tb12 to Tb14, Tb21, Tb23, Tb24, Tb31, Tb32, Tb34, Tb41 to Tb43, and a storage capacitor C1.

In the embodiment of the disclosure, the scan transistor Ts, the four de-multiplexer transistors Td1 to Td4, and the twelve bias transistors Tb12 to Tb14, Tb21, Tb23, Tb24, Tb31, Tb32, Tb34, Tb41 to Tb43 are N-type transistors, but the disclosure is not limited thereto. The tunable circuits 921 to 924 may have different tunable characteristics, such as different resonant frequency tunable ranges. In the embodiment of the disclosure, each of the tunable circuits 921 to 924 includes a tunable component. In one embodiment of the disclosure, the tunable component may be a voltage-controlled and capacitance tunable component, such as a varactor diode.

Moreover, in one embodiment of disclosure, the tunable circuits 921 to 924 may form transmitter circuits and receiver circuits which have different resonant frequency tunable ranges in beam-steerable bidirectional switchable dual-band antenna (e.g. a transmitter and a receiver circuit for each Ku-/Ka-band of a satellite communication), operate independently in half-duplex operation with switchable dual-band, and include varactor diodes as the voltage-controlled and capacitance tunable component to tune resonant frequency of the transmitter and the receiver circuits for each band.

In the embodiment of the disclosure, a first terminal of the scan transistor Ts is coupled to a data line DL(m), where m is between 1 to M. A second terminal of the scan transistor Ts is coupled to a first terminal of the storage capacitor C1, and a plurality of first terminals of the de-multiplexer transistors Td1 to Td4. A control terminal of the scan transistor Ts is coupled to a scan line SL(n), where n is between 1 to N/4. A second terminal of the de-multiplexer transistor Td1 is coupled to the bias transistors Tb12, Tb13, Tb14, and the tunable circuit 921. A control terminal of the de-multiplexer transistor Td1 is coupled to a control line CL1. A plurality of first terminals of the bias transistors Tb12, Tb13, and Tb14 are coupled to a constant bias voltage Vb1. A plurality of second terminals of the bias transistors Tb12, Tb13, and Tb14 are coupled to the second terminal of the de-multiplexer transistor Td1 and the tunable circuit 921. A control terminal of the bias transistor Tb12 is coupled to a control line CL2. A control terminal of the bias transistor Tb13 is coupled to a control line CL3. A control terminal of the bias transistor Tb14 is coupled to a control line CL4. A second terminal of the storage capacitor C1 is coupled to a constant voltage source Vf.

A second terminal of the de-multiplexer transistor Td2 is coupled to the bias transistors Tb21, Tb23, Tb24, and the tunable circuit 922. A control terminal of the de-multiplexer transistor Td2 is coupled to the control line CL2. A plurality of first terminals of the bias transistors Tb21, Tb23, and Tb24 are coupled to the second terminal of the de-multiplexer transistor Td2 and the tunable circuit 922. A plurality of second terminals of the bias transistors Tb21, Tb23, and Tb24 are coupled to a constant bias voltage Vb2. A control terminal of the bias transistor Tb23 is coupled to the control line CL3. A control terminal of the bias transistor Tb24 is coupled to the control line CLA. A control terminal of the bias transistor Tb21 is coupled to the control line CL1.

A second terminal of the de-multiplexer transistor Td3 is coupled to the bias transistors Tb31, Tb32, Tb34, and the tunable circuit 923. A control terminal of the de-multiplexer transistor Td3 is coupled to the control line CL3. A plurality of first terminals of the bias transistors Tb31, Tb32, and Tb34 are coupled to the second terminal of the de-multiplexer transistor Td3 and the tunable circuit 923. A plurality of second terminals of the bias transistors Tb31, Tb32, and Tb34 are coupled to a constant bias voltage Vb3. A control terminal of the bias transistor Tb34 is coupled to the control line CLA. A control terminal of the bias transistor Tb31 is coupled to the control line CL1. A control terminal of the bias transistor Tb32 is coupled to the control line CL2.

A second terminal of the de-multiplexer transistor Td4 is coupled to the bias transistors Tb41 to Tb43, and the tunable circuit 924. A control terminal of the de-multiplexer transistor Td4 is coupled to the control line CL4. A plurality of first terminals of the bias transistors Tb41 to Tb43 are coupled to the second terminal of the de-multiplexer transistor Td4 and the tunable circuit 924. A plurality of second terminals of the bias transistors Tb41 to Tb43 are coupled to a constant bias voltage Vb4. A control terminal of the bias transistor Tb41 is coupled to the control line CL1. A control terminal of the bias transistor Tb42 is coupled to the control line CL2. A control terminal of the bias transistor Tb43 is coupled to the control line CL3.

In the embodiment of the disclosure, the control terminal of the scan transistor Ts receives a scan signal SS(n) from the scan line SL(n), so that the scan transistor Ts may be turned-on to receive a data signal DS(m) with a corresponding data voltage Vdata from the data line DL(m) and store the data voltage Vdata into the storage capacitor C1. The de-multiplexer transistors Td1 to Td4 receive different control signals CS1 to CS4 through the different control lines CL1 to CL4, and the bias transistors Tb12 to Tb14, Tb21, Tb23, Tb24, Tb31, Tb32, Tb34, Tb41 to Tb43 also receive different control signals CS1 to CS4 through the different control lines CL1 to CL4.

In the embodiment of the disclosure, the de-multiplexer transistor Td1 and the bias transistors Tb21, Tb31, and Tb41 receive the same control signal CS1. The de-multiplexer transistor Td2 and the bias transistors Tb12, Tb32, and Tb42 receive the same control signal CS2. The de-multiplexer transistor Td3 and the bias transistors Tb13, Tb23, and Tb43 receive the same control signal CS3. The de-multiplexer transistor Td4 and the bias transistors Tb14, Tb24, and Tb34 receive the same control signal CS4. The de-multiplexer transistors Td1 to Td4 may be selectively turned-on according to the control signals CS1 to CS4 to selectively transmit the corresponding data voltage Vdata from the storage capacitor C1 to the tunable circuit 921, 922, 923, or 924, and the bias transistors Tb12 to Tb14, Tb21, Tb23, Tb24, Tb31, Tb32, Tb34, Tb41 to Tb43 may also be selectively turned-on according to the control signals CS1 to CS4 to provide the constant bias voltage Vb1, Vb2, Vb3, or Vb4 to the tunable circuit 921, 922, 923, or 924, respectively.

Thus, the pixel circuit 910 may provide a driving signal with driving voltage V1, V2, V3, and V4 to drive the tunable circuit 921, 922, 923, and 924 according to the storage capacitor C1 which is applied the corresponding data voltage Vdata as a working tunable circuit, or according to the bias transistors Tb12 to Tb14, Tb21, Tb23, Tb24, Tb31, Tb32, Tb34, Tb41 to Tb43 which is applied the constant bias voltage Vb1, Vb2, Vb3 and Vb4 as a non-working tunable circuit, respectively. In other words, since the each four adjacent tunable circuits of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

Moreover, for the transmitter circuits and the receiver circuits of the beam-steerable bidirectional switchable dual-band antenna device, the pixel circuit 910 may selectively apply the corresponding data voltage Vdata to one of the tunable circuits 921 to 924 as the working tunable circuit and apply the corresponding constant bias voltages to the other three tunable circuits as non-working tunable circuits with the selective scanning, which contribute a fast beam-steering by data writing of the transmitter circuits or the receiver circuits of an operating band for a half-duplex operation of the beam-steerable bidirectional switchable dual-band antenna device.

Figure 10:
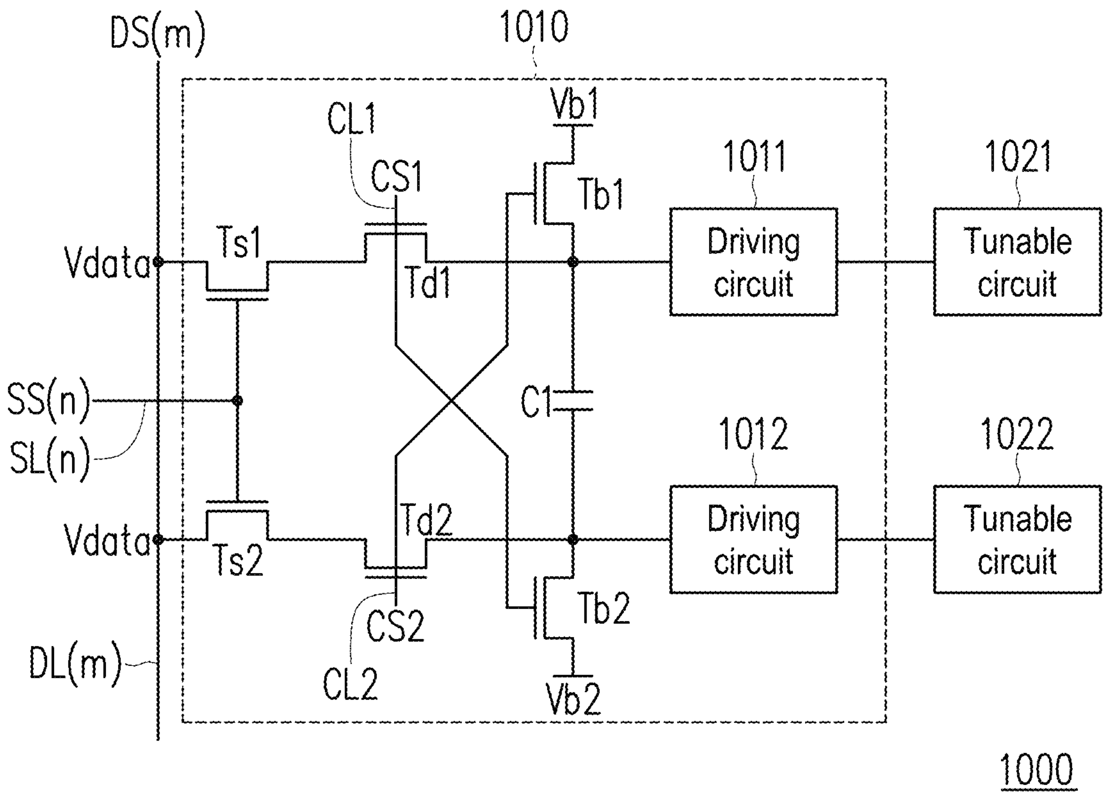
FIG. 10 is a schematic diagram of an electronic unit according to an embodiment of the disclosure.

FIG. 10 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 10, each of the electronic units of the above embodiment of FIG. 1 may be implemented as the electronic unit 1000 of FIG. 10, and each two adjacent tunable circuits may be implemented as two tunable circuits 1021 and 1022 of FIG. 10. In the embodiment of the disclosure, the electronic unit 1000 includes a pixel circuit 1010, and the two tunable circuits 1021 and 1022. The pixel circuit 1010 is coupled to the tunable circuits 1021 and 1022. The pixel circuit 1010 includes two scan transistors Ts1, Ts2, two de-multiplexer transistors Td1, Td2, two bias transistors Tb1, Tb2, a storage capacitor C1, and two driving circuit 1011 and 1012. In the embodiment of the disclosure, the scan transistors Ts1, Ts2, the bias transistors Tb1, Tb2, and the de-multiplexer transistors Td1, Td2 are N-type transistors, but the disclosure is not limited thereto.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/2. A second terminal of the de-multiplexer transistor Td1 is coupled to the bias transistor Tb1, a first terminal of the storage capacitor C1, and the driving circuit 1011. A control terminal of the de-multiplexer transistor Td1 is coupled to a control line CL1. A first terminal of the bias transistor Tb1 is coupled to a constant bias voltage Vb1. A second terminal of the bias transistor Tb1 is coupled to the second terminal of the de-multiplexer transistor Td1, the first terminal of the storage capacitor C1, and the driving circuit 1011. The driving circuit 1011 is further coupled to the tunable circuit 1021, and configured to respectively provide the driving signal corresponding to the data voltage to the tunable circuit 1021. A control terminal of the bias transistor Tb1 is coupled to a control line CL2.

In the embodiment of the disclosure, a first terminal of the scan transistor Ts2 is coupled to the same data line DL(m). A second terminal of the scan transistor Ts2 is coupled to a first terminal of the de-multiplexer transistor Td2. A control terminal of the scan transistor Ts2 is coupled to the same scan line SL(n). A second terminal of the de-multiplexer transistor Td2 is coupled to the bias transistor Tb2, a second terminal of the storage capacitor C1, and the driving circuit 1012. A control terminal of the de-multiplexer transistor Td2 is coupled to the control line CL2. A first terminal of the bias transistor Tb2 is coupled to the second terminal of the de-multiplexer transistor Td1, the second terminal of the storage capacitor C1, and the driving circuit 1012. A second terminal of the bias transistor Tb2 is coupled to a constant bias voltage Vb2. The driving circuit 1012 is further coupled to the tunable circuit 1022, and configured to respectively provide the driving signal corresponding to the data voltage to the tunable circuit 1022. A control terminal of the bias transistor Tb2 is coupled to the control line CL1.

Different from the embodiment of FIG. 2, the pixel circuit 1010 further includes the driving circuits 1011 and 1012 to enhance driving capability. In one embodiment of the disclosure, the driving circuits 1011 and 1012 may be further configured to convert multiple driving voltages into multiple driving currents to control the tunable circuits 1021 and 1022 with current instead of voltage. In addition, in other embodiments of the disclosure, the pixel circuits of the above embodiments of FIG. 4 to FIG. 7, and FIG. 9 may also be designed to further include a plurality of driving circuits respectively.

Figure 11:
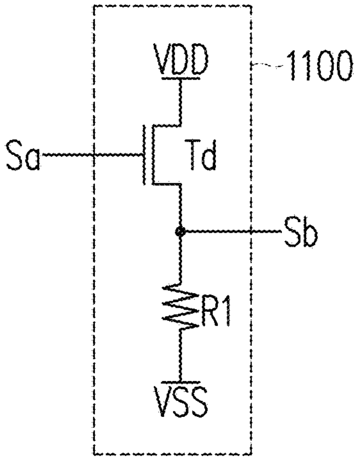
FIG. 11 is a schematic diagram of a driving circuit according to an embodiment of the disclosure.

FIG. 11 is a schematic diagram of a driving circuit according to an embodiment of the disclosure. Referring to FIG. 11, the driving circuit of the above embodiments may be implemented as the driving circuit 1100. In the embodiments of the disclosure, the driving circuit 1100 includes a driving transistor Td and a resistor R1. A first terminal of the driving transistor Td is coupled to a first operation voltage VDD. A second terminal of the driving transistor Td is coupled to a first terminal of the resistor R1. A control terminal of the driving transistor Td receives a driving signal Sa with a driving voltage provided by the corresponding capacitor (e.g. the storage capacitor C1 in FIG. 10). A second terminal of the resistor R2 is coupled to a second operation voltage VSS. In the embodiment of the disclosure, the driving transistor Td may be a N-type transistor. The first operation voltage VDD may be higher than the second operation voltage VSS. In the embodiment of the disclosure, the driving transistor Td may be operated as a source follower amplifier to convert the driving signal Sa to a driving signal Sb with another driving voltage (i.e. enhance driving capability) for driving the corresponding tunable circuit (e.g. the tunable circuit 1021 or the tunable circuit 1022 in FIG. 10).

Figure 12:
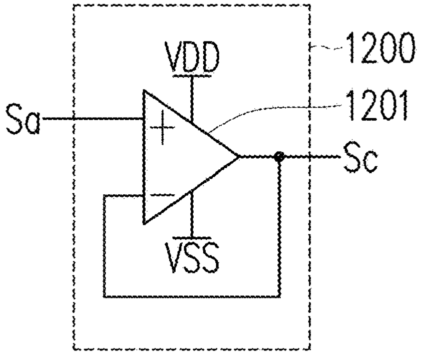
FIG. 12 is a schematic diagram of a driving circuit according to an embodiment of the disclosure.

FIG. 12 is a schematic diagram of a driving circuit according to an embodiment of the disclosure. Referring to FIG. 12, the driving circuit of the above embodiments may be implemented as the driving circuit 1200. In the embodiments of the disclosure, the driving circuit 1200 includes an operational amplifier 1201. A non-inverting input terminal of the operational amplifier 1201 may receive a driving signal Sa with a driving voltage provided by the corresponding capacitor (e.g. the storage capacitor C1 in FIG. 10). An inverting input terminal of the operational amplifier 1201 is coupled to an output terminal of operational amplifier 1201. The operational amplifier 1201 is further coupled to a first operation voltage VDD and a second operation voltage VSS. In the embodiment of the disclosure, the operational amplifier 1201 is configured as a voltage amplifier, and configured to convert the driving signal Sa to a driving signal Sc with another driving voltage (i.e. enhance driving capability) for driving the corresponding tunable circuit (e.g. the tunable circuit 1021 or the tunable circuit 1022 in FIG. 10).

Figure 13:
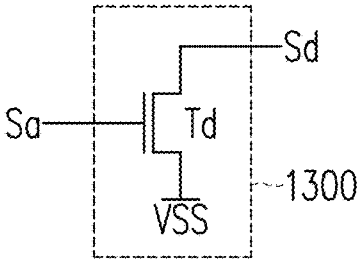
FIG. 13 is a schematic diagram of a driving circuit according to an embodiment of the disclosure.

FIG. 13 is a schematic diagram of a driving circuit according to an embodiment of the disclosure. Referring to FIG. 13, the driving circuit of the above embodiments may be implemented as the driving circuit 1300. In the embodiments of the disclosure, the driving circuit 1300 includes a driving transistor Td. A first terminal of the driving transistor Td is coupled to the corresponding tunable circuit (e.g. the tunable circuit 1021 or the tunable circuit 1022 in FIG. 10). A second terminal of the driving transistor Td is coupled to a second operation voltage VSS. A control terminal of the driving transistor Td receives a driving signal Sa with a driving voltage provided by the corresponding capacitor (e.g. the storage capacitor C1 in FIG. 10). In the embodiment of the disclosure, the driving transistor Td may be a N-type transistor. The driving transistor Td may be operated as a current driver to convert the driving signal Sa to a driving signal Sd with driving current for driving the corresponding tunable circuit.

Figure 14:
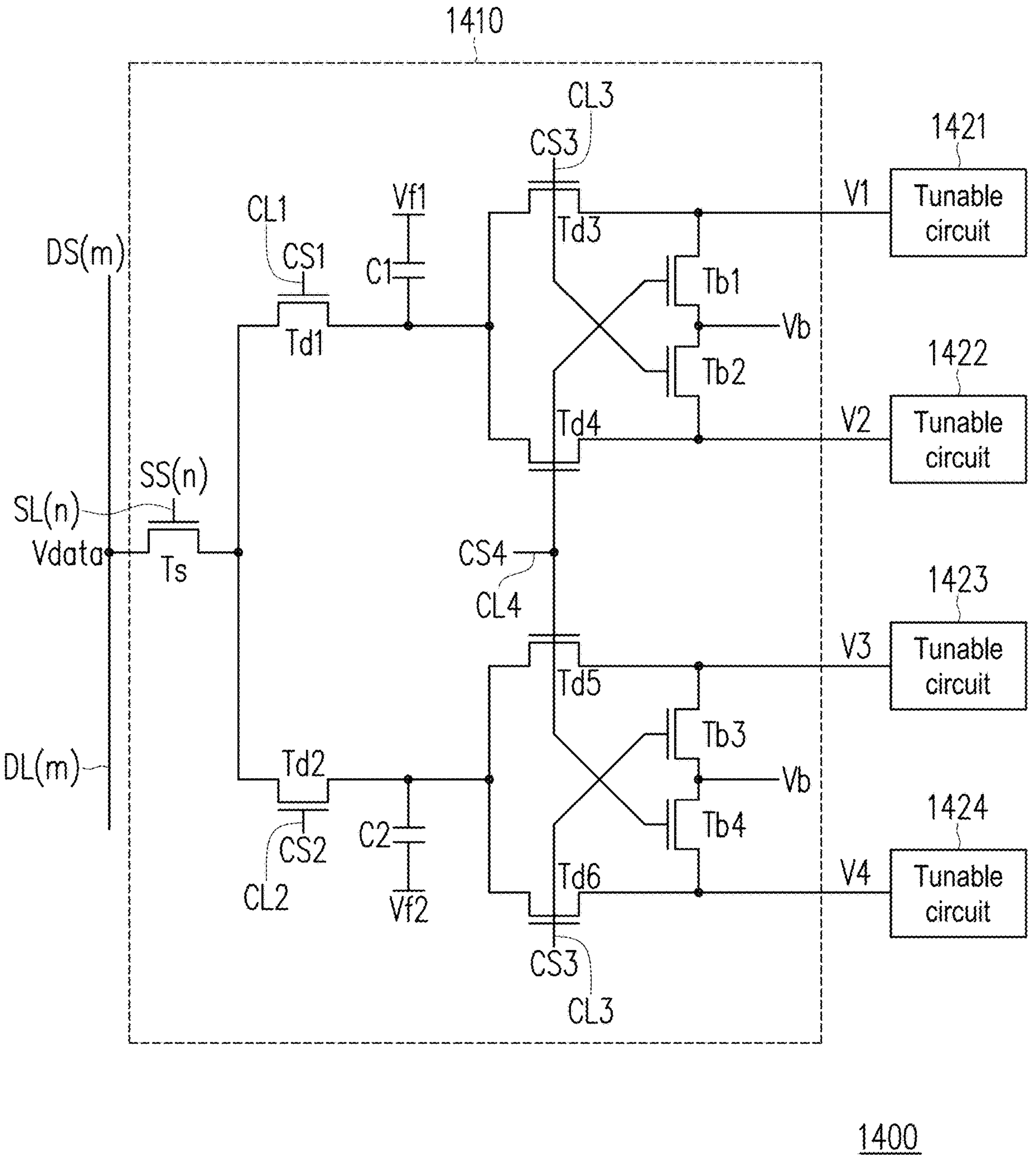
FIG. 14 is a schematic diagram of an electronic unit according to an embodiment of the disclosure.

FIG. 14 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 14, each of the electronic units of the above embodiment of FIG. 1 may be implemented as the electronic unit 1400 of FIG. 14, and each four adjacent tunable circuits may be implemented as four tunable circuits 1421 to 1424 of FIG. 14. In the embodiment of the disclosure, the electronic unit 1400 includes a pixel circuit 1410, and the four tunable circuits 1421 to 1424. The pixel circuit 1410 is coupled to the tunable circuits 1421 to 1424. The pixel circuit 1410 includes one scan transistor Ts, six de-multiplexer transistors Td1 to Td6, four bias transistors Tb1 to Tb4, and two storage capacitors C1 and C2.

In the embodiment of the disclosure, the scan transistor Ts, the six de-multiplexer transistors Td1 to Td6, and the four bias transistors Tb1 to Tb4 are N-type transistors, but the disclosure is not limited thereto. The tunable circuits 1421 to 1424 may have different tunable characteristics, such as different resonant frequency tunable ranges. In the embodiment of the disclosure, each of the tunable circuits 1421 to 1424 includes a tunable component. In one embodiment of the disclosure, the tunable component may be a voltage-controlled and capacitance tunable component, such as a varactor diode.

Moreover, in one embodiment of disclosure, the tunable circuits 1421 to 1424 may form transmitter circuits and receiver circuits which have different resonant frequency tunable ranges in beam-steerable bidirectional switchable dual-band antenna (e.g. a transmitter and a receiver circuit for each Ku-/Ka-band of a satellite communication), operate independently in full-duplex operation with switchable dual-band, and include varactor diodes as the voltage-controlled and capacitance tunable component to tune resonant frequency of the transmitter circuits and the receiver circuits for each band.

In the embodiment of the disclosure, a first terminal of the scan transistor Ts is coupled to a data line DL(m), where m is between 1 to M. A second terminal of the scan transistor Ts is coupled to a first terminal of the de-multiplexer transistor Td1 and a first terminal of the de-multiplexer transistor Td2. A control terminal of the scan transistor Ts is coupled to a scan line SL(n), where n is between 1 to N/4. A second terminal of the de-multiplexer transistor Td1 is coupled to a first terminal of the storage capacitor C1, a first terminal of the de-multiplexer transistor Td3, and a first terminal of the de-multiplexer transistor Td4. A control terminal of the de-multiplexer transistor Td1 is coupled to a control line CL1. A second terminal of the de-multiplexer transistor Td2 is coupled to a first terminal of the storage capacitor C2, a first terminal of the de-multiplexer transistor Td5, and a first terminal of the de-multiplexer transistor Td6. A control terminal of the de-multiplexer transistor Td2 is coupled to a control line CL2. A second terminal of the storage capacitor C1 is coupled to a constant voltage source Vf1. A second terminal of the storage capacitor C2 is coupled to a constant voltage source Vf2.

A second terminal of the de-multiplexer transistor Td3 is coupled to the bias transistor Tb1 and the tunable circuit 1421. A control terminal of the de-multiplexer transistor Td3 is coupled to a control line CL3. A second terminal of the de-multiplexer transistor Td4 is coupled to the bias transistor Tb2 and the tunable circuit 1422. A control terminal of the de-multiplexer transistor Td4 is coupled to a control line CL4. A first terminal of the bias transistor Tb1 is coupled to the second terminal of the de-multiplexer transistor Td3 and the tunable circuit 1421. A second terminal of the bias transistor Tb1 is coupled to a two-level voltage source Vb. A control terminal of the bias transistor Tb1 is coupled to a control line CL4. A first terminal of the bias transistor Tb2 is coupled to the two-level voltage source Vb. A second terminal of the bias transistor Tb2 is coupled to the second terminal of the de-multiplexer transistor Td4 and the tunable circuit 1422. A control terminal of the bias transistor Tb2 is coupled to the control line CL3.

A second terminal of the de-multiplexer transistor Td5 is coupled to the bias transistor Tb3 and the tunable circuit 1423. A control terminal of the de-multiplexer transistor Td5 is coupled to a control line CL4. A second terminal of the de-multiplexer transistor Td6 is coupled to the bias transistor Tb4 and the tunable circuit 1424. A control terminal of the de-multiplexer transistor Td6 is coupled to a control line CL3. A first terminal of the bias transistor Tb3 is coupled to the second terminal of the de-multiplexer transistor Td5 and the tunable circuit 1423. A second terminal of the bias transistor Tb3 is coupled to the two-level voltage source Vb. A control terminal of the bias transistor Tb3 is coupled to the control line CL3. A first terminal of the bias transistor Tb4 is coupled to the two-level voltage source Vb. A second terminal of the bias transistor Tb4 is coupled to the second terminal of the de-multiplexer transistor Td6 and the tunable circuit 1424. A control terminal of the bias transistor Tb4 is coupled to a control line CL4.

In the embodiment of the disclosure, the control terminal of the scan transistor Ts receives a scan signal SS(n) from the scan line SL(n), so that the scan transistor Ts may be turned-on to receive a data signal DS(m) with a corresponding data voltage Vdata from the data line DL(m). The de-multiplexer transistors Td1 and Td2 receive different control signals CS1 and CS2 through the different control lines CL1 and CL2 to further transmit the data voltage Vdata into the storage capacitor C1 and the storage capacitor C2 respectively. The de-multiplexer transistors Td3 and Td4 receive different control signals CS3 and CS4 through the different control lines CL3 and CL4, and the bias transistors Tb1 and Tb2 also receive different control signals CS3 and CS4 through the different control lines CL3 and CL4. The de-multiplexer transistors Td5 and Td6 receive different control signals CS3 and CS4 through the different control lines CL3 and CL4, and the bias transistors Tb3 and Tb4 also receive different control signals CS3 and CS4 through the different control lines CL3 and CLA.

In the embodiment of the disclosure, the de-multiplexer transistors Td1 and Td2 receive different control signals CS1 and CS2, so that the de-multiplexer transistors Td1 and Td2 may be turned-on at the different times to respectively provide the data signal DS(m) with the corresponding data voltage Vdata to the storage capacitors C1 and C2 through the scan transistor Ts.

In the embodiment of the disclosure, the de-multiplexer transistor Td3 and the bias transistor Tb2 receive the same control signal CS3, and the de-multiplexer transistor Td4 and the bias transistor Tb1 receive the same control signal CS4. The de-multiplexer transistors Td3 and Td4 may be selectively turned-on according to the control signals CS3 and CS4 to selectively transmit the corresponding data voltage Vdata from the storage capacitor C1 to the tunable circuit 1421 or the tunable circuit 1422, and the bias transistors Tb1 and Tb2 may also be selectively turned-on according to the control signals CS3 and CS4 to provide a corresponding constant bias voltage from the two-level voltage source Vb to the tunable circuit 1421 or the tunable circuit 1422.

In the embodiment of the disclosure, the de-multiplexer transistor Td5 and the bias transistor Tb4 receive the same control signal CS4, and the de-multiplexer transistor Td6 and the bias transistor Tb3 receive the same control signal CS3. The de-multiplexer transistors Td5 and Td6 may be selectively turned-on according to the control signals CS3 and CS4 to selectively transmit the corresponding data voltage Vdata from the storage capacitor C2 to the tunable circuit 1423 or the tunable circuit 1424, and the bias transistors Tb3 and Tb4 may also be selectively turned-on according to the control signals CS3 and CS4 to provide a corresponding constant bias voltage from the two-level voltage source Vb to the tunable circuit 1423 or the tunable circuit 1424, selectively.

Thus, the pixel circuit 1410 may provide driving signals with driving voltage V1, V2, V3, and V4 to drive the tunable circuit 1421, 1422, 1423, and 1424 according to the storage capacitor C1 and C2 which is applied the corresponding data voltage Vdata or according to the two-level voltage source Vb which is applied the corresponding the constant bias voltage. In other words, since the each four adjacent tunable circuits of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

Figure 15:
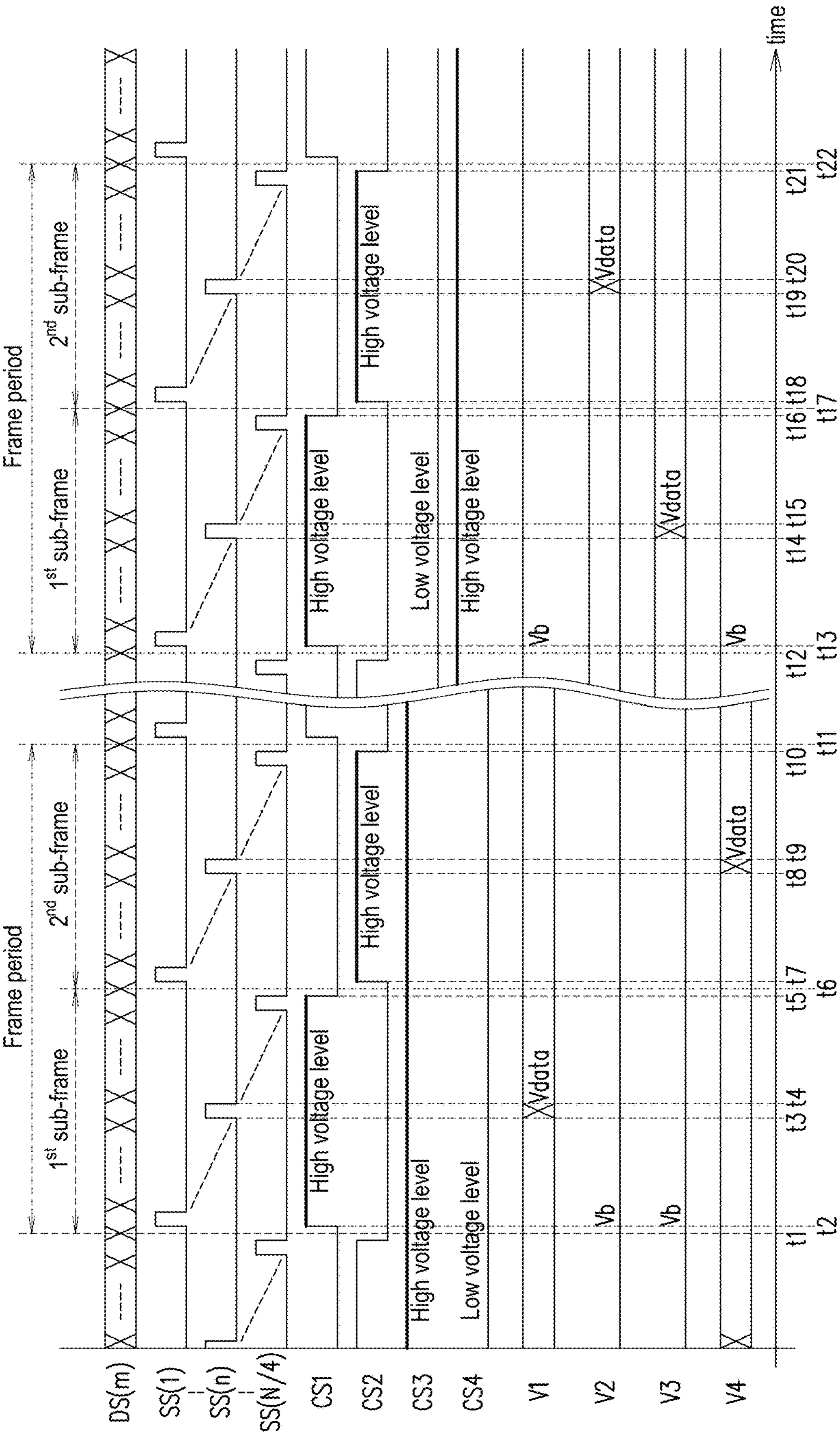
FIG. 15 is a timing diagram of relevant signals according to the embodiment of the FIG. 14.

FIG. 15 is a timing diagram of relevant signals according to the embodiment of the FIG. 14. The following embodiment assumes that the electronic unit 1400 may be a (m,n)-th electronic unit, and the N/4 scan lines of the electronic device may provide the scan signals SS(1) to SS(N/4) respectively. As shown in FIG. 15, the electronic unit 1400 may receive the data signal DS(m), the scan signal SS(n), the control signals CS1 to CS4. In the embodiment of the disclosure, the signal waveforms of the control signals CS1 and CS2 are complementary, and the signal waveforms of the control signals CS3 and CS4 are complementary. Referring to FIG. 14 and FIG. 15, during one frame period from time t1 to time t11, the pixel circuit 1410 may split data writing period of the tunable circuits 1421 and 1424 into a first sub-frame period from time t1 to time t6 and a second sub-frame period from time t6 to time t11.

During the period from time t1 to time t11, the control signal CS3 may be a high voltage level, and the control signal CS4 may be a low voltage level. Thus, the de-multiplexer transistors Td3 and Td6 and the bias transistor Tb2 and Tb3 are turned-on, and the de-multiplexer transistors Td4 and Td5 and the bias transistor Tb1 and Tb4 are turned-off. Therefore the pixel circuit 1410 may provide a driving signal with driving voltage V1, V2, V3 and V4 to drive the tunable circuit 1421, 1422, 1423 and 1224 according to the storage capacitor C1 through the de-multiplexer transistor Td3 for the tunable circuit 1421, the two-level voltage source Vb through the bias transistor Tb2 for the tunable circuit 1422, the two-level voltage source Vb through the bias transistor Tb3 for the tunable circuit 1423 and the storage capacitor C2 through the de-multiplexer transistor Td6 for the tunable circuit 1424, respectively.

Specifically, during a period from time t2 to time t5, the control signal CS1 is changed from a low voltage level to a high voltage level, and the control signal CS2 is maintained at the low voltage level. The control signal CS3 may be a high voltage level, and the control signal CS4 may be a low voltage level. Thus, during the period from time t2 to time t5, the de-multiplexer transistors Td1, Td3, Td6 and the bias transistor Tb2, Tb3 are turned-on, and the de-multiplexer transistors Td2, Td4, Td5 and the bias transistor Tb1, Tb4 are turned-off.

During a period from time t3 to time t4, the scan signal SS(n) is changed from the low voltage level to the high voltage level, so that the scan transistor Ts is turned-on. Thus, during the period from time t3 to time t4, the de-multiplexer transistor Td1 may provide the data signal DS(m) with the corresponding data voltage Vdata to the storage capacitor C1, so that the storage capacitor C1 may store the data signal DS(m) with the corresponding data voltage Vdata. The de-multiplexer transistor Td3 may provide the data signal DS(m) with the corresponding data voltage Vdata to the tunable circuit 1421 according to the storage capacitor C1. Thus, the pixel circuit 1410 may provide the driving signal with driving voltage V1 to drive the tunable circuit 1421 according to the corresponding data voltage Vdata currently stored in the storage capacitor C1.

During a period from time t7 to time t10, the control signal CS2 is changed from the low voltage level to the high voltage level, and the control signal CS1 is maintained at the low voltage level. The control signal CS4 may be the high voltage level, and the control signal CS3 may be the low voltage level. Thus, during the period from time t7 to time t10, the de-multiplexer transistors Td2, Td3, Td6 and the bias transistors Tb2, Tb3 are turned-on, and the de-multiplexer transistors Td1, Td4, Td5 and the bias transistor Tb1, Tb4 are turned-off.

During a period from time t8 to time t9, the scan signal SS(n) is changed from the low voltage level to the high voltage level, so that the scan transistor Ts is turned-on. Thus, during the period from time t8 to time t9, the de-multiplexer transistor Td2 may provide the data signal DS(m) with the corresponding data voltage Vdata to the storage capacitor C2, so that the storage capacitor C2 may store the data signal DS(m) with the corresponding data voltage Vdata. The de-multiplexer transistor Td6 may provide the data signal DS(m) with the corresponding data voltage Vdata to the tunable circuit 1424 according to the storage capacitor C2. Thus, the pixel circuit 1410 may provide the driving signal with driving voltage V4 to drive the tunable circuit 1424 according to the corresponding data voltage Vdata currently stored in the storage capacitor C2.

During another one frame period from time t12 to time t22, the pixel circuit 1410 may split data writing period of the tunable circuits 1422 and 1423 into a first sub-frame period from time t12 to time t17 and a second sub-frame period from time t17 to time t22. During the period from time t12 to time t22, the control signal CS3 may be the low voltage level, and the control signal CS4 may be the high voltage level. Thus, the de-multiplexer transistors Td3 and Td6 and the bias transistor Tb2 and Tb3 are turned-off, and the de-multiplexer transistors Td4 and Td5 and the bias transistor Tb1 and Tb4 are turned-on. Therefore the pixel circuit 1410 may provide a driving signal with driving voltage V1, V2, V3 and V4 to drive the tunable circuit 1421, 1422, 1423 and 1424 according to the two-level voltage source Vb through the bias transistor Tb1 for the tunable circuit 1421, the storage capacitor C1 through the de-multiplexer transistor Td4 for the tunable circuit 1422, the storage capacitor C2 through the de-multiplexer transistor Td5 for the tunable circuit 1423 and the two-level voltage source Vb through the bias transistor Tb4 for the tunable circuit 1424, respectively.

Specifically, during a period from time t13 to time t16, the control signal CS1 is changed from the low voltage level to the high voltage level, and the control signal CS2 is maintained at the low voltage level. The control signal CS3 may be the low voltage level, and the control signal CS4 may be the high voltage level. Thus, during the period from time t13 to time t16, the de-multiplexer transistors Td1, Td4, Td5 and the bias transistors Tb1, Tb4 are turned-on, and the de-multiplexer transistors Td2, Td3, Td6 and the bias transistors Tb2, Tb3 are turned-off.

During a period from time t14 to time t15, the scan signal SS(n) is changed from the low voltage level to the high voltage level, so that the scan transistor Ts is turned-on. Thus, during the period from time t14 to time t15, the de-multiplexer transistor Td1 may provide the data signal DS(m) with the corresponding data voltage Vdata to the storage capacitor C1, so that the storage capacitor C1 may store the data signal DS(m) with the corresponding data voltage Vdata. The de-multiplexer transistor Td4 may provide the data signal DS(m) with the corresponding data voltage Vdata to the tunable circuit 1422 according to the storage capacitor C1. Thus, the pixel circuit 1410 may provide the driving signal with driving voltage V2 to drive the tunable circuit 1422 according to the corresponding data voltage Vdata currently stored in the storage capacitor C1.

During a period from time t18 to time t21, the control signal CS2 is changed from the low voltage level to the high voltage level, and the control signal CS1 is maintained at the low voltage level. The control signal CS4 may be the high voltage level, and the control signal CS3 may be the low voltage level. Thus, during the period from time t18 to time t21, the de-multiplexer transistors Td2, Td4, Td5 and the bias transistors Tb1, Tb4 are turned-on, and the de-multiplexer transistors Td1, Td3, Td6 and the bias transistors Tb2, Tb3 are turned-off.

During a period from time t19 to time t20, the scan signal SS(n) is changed from the low voltage level to the high voltage level, so that the scan transistor Ts is turned-on. Thus, during the period from time t19 to time t20, the de-multiplexer transistor Td2 may provide the data signal DS(m) with the corresponding data voltage Vdata to the storage capacitor C2, so that the storage capacitor C2 may store the data signal DS(m) with the corresponding data voltage Vdata. The de-multiplexer transistor Td5 may provide the data signal DS(m) with the corresponding data voltage Vdata to the tunable circuit 1423 according to the storage capacitor C2. Thus, the pixel circuit 1410 may provide the driving signal with driving voltage V3 to drive the tunable circuit 1423 according to the corresponding data voltage Vdata currently stored in the storage capacitor C2.

In the embodiment of the disclosure, the turn-on periods of the de-multiplexer transistors Td1 and Td2 are non-overlapping. Therefore, the during one frame period, the pixel circuit 1410 may split data writing period of the tunable circuits 1421 and 1424 into two sub-frame periods of one frame period to realize an efficient driving of the tunable circuit 1421 and 1424 with an interlaced scanning when the tunable circuit 1421 and 1424 operate independently, or may split data writing period of the tunable circuits 1422 and 1423 into two sub-frame periods of another one frame period to realize an efficient driving of the tunable circuit 1422 and 1423 with an interlaced scanning when the tunable circuit 1422 and 1423 operate independently.

Moreover, for the transmitter circuits and the receiver circuits of the switchable dual-band antenna device, data writing period of each transmitter circuit and receiver circuit is split into two sub-frame periods by the pixel circuit 1410 selectively, like the tunable circuits 1421 and 1424 with the interlaced scanning (e.g. in case of a full-duplex Ku-band operation), or the tunable circuits 1422 and 1423 with the interlaced scanning (e.g. in case of a full-duplex Ka-band operation) as the working tunable circuits and the pixel circuit 1410 may apply the constant bias voltages to the non-working tunable circuits for a non-operating band, which contribute a fast beam-steering by separate data writing of the transmitter circuits and the receiver circuits in each sub-frame period for a full-duplex operation of the switchable Ku/Ka dual-band antenna device.

In summary, the electronic device of the disclosure may selectively drive multiple tunable circuits, and may use fewer scan lines and fewer scan transistors to effectively reduce the circuit layout area and device volume.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
- a plurality of electronic units, wherein each of the plurality of electronic units comprises:
  - a pixel circuit; and
  - a plurality of tunable circuits, coupled to the pixel circuit, wherein the pixel circuit comprises:
  - at least one scan transistor;
  - a plurality of de-multiplexer transistors, coupled to the at least one scan transistor;
  - a plurality of bias transistors, coupled to the plurality of de-multiplexer transistors; and
  - a storage capacitor, coupled to a data line through the at least one scan transistor.

2. The electronic device according to claim 1, wherein the pixel circuit comprises a plurality of scan transistors, and the plurality of scan transistors receive same scan signal.

3. The electronic device according to claim 1, wherein the plurality of de-multiplexer transistors receives different control signals, and the plurality of bias transistors receive the different control signals.

4. The electronic device according to claim 3, wherein a plurality of turn-on periods of the plurality of de-multiplexer transistors are non-overlapping.

5. The electronic device according to claim 4, wherein signal waveforms of the different control signals are complementary.

6. The electronic device according to claim 3, wherein one of the plurality of de-multiplexer transistors and one of the plurality of bias transistors receive a first control signal, and another of the plurality of de-multiplexer transistors and another of the plurality of bias transistors receive a second control signal.

7. The electronic device according to claim 1, wherein the at least one scan transistor is coupled between the data line and the plurality of de-multiplexer transistors.

8. The electronic device according to claim 7, wherein the pixel circuit comprises one scan transistor.

9. The electronic device according to claim 7, wherein the storage capacitor is coupled between the at least one scan transistor and the plurality of de-multiplexer transistors.

10. The electronic device according to claim 7, wherein the storage capacitor is coupled between the plurality of de-multiplexer transistors and the plurality of tunable circuits.

11. The electronic device according to claim 1, wherein the pixel circuit comprises a plurality of scan transistors and the plurality of de-multiplexer transistors are coupled between the data line and the plurality of scan transistors.

12. The electronic device according to claim 11, wherein the storage capacitor is coupled between the plurality of scan transistors and the plurality of tunable circuits.

13. The electronic device according to claim 1, wherein each of the plurality of bias transistors is coupled between a corresponding one of the plurality of tunable circuits and a voltage source.

14. The electronic device according to claim 13, wherein the storage capacitor receives a data voltage from the data line.

15. The electronic device according to claim 14, wherein one of the plurality of tunable circuits receives a control signal corresponding to the data voltage, and another of the plurality of tunable circuits receives a constant bias voltage from the voltage source through the corresponding one of the plurality of bias transistors.

16. The electronic device according to claim 1, wherein the plurality of tunable circuits is different tunable characteristics.

17. The electronic device according to claim 16, wherein the plurality of tunable circuits has different resonant frequency tunable ranges.

18. The electronic device according to claim 1, wherein each of the plurality of tunable circuits comprises a tunable component.

19. The electronic device according to claim 18, wherein the tunable component is a capacitance tunable component.

20. The electronic device according to claim 1, wherein the electronic device is an antenna device.

* * * * *